US006834043B1

(12) United States Patent
Vook et al.

(10) Patent No.: US 6,834,043 B1
(45) Date of Patent: Dec. 21, 2004

(54) METHOD AND DEVICE FOR EXPLOITING TRANSMIT DIVERSITY IN TIME VARYING WIRELESS COMMUNICATION SYSTEMS

(75) Inventors: Frederick W. Vook, Schaumburg, IL (US); Timothy A. Thomas, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 532 days.

(21) Appl. No.: 09/624,453

(22) Filed: Jul. 24, 2000

(51) Int. Cl.[7] .................. H04J 11/00; H04B 7/216; H04B 15/00; H04L 27/20; H04L 1/02
(52) U.S. Cl. .................. 370/310; 370/203; 370/335; 370/342; 375/295; 375/347; 455/65; 455/69
(58) Field of Search ................. 370/203, 206, 370/208, 310, 335, 342; 375/260, 265, 295, 347, 267; 342/372, 378, 380, 383, 367; 455/69, 67, 70, 101, 562

(56) References Cited

U.S. PATENT DOCUMENTS

| | | | | |
|---|---|---|---|---|
| 5,140,615 A | * | 8/1992 | Jasper et al. ............... | 375/100 |
| 5,546,429 A | * | 8/1996 | Chiasson et al. ........... | 375/341 |
| 5,553,102 A | * | 9/1996 | Jasper et al. ............... | 375/347 |
| 5,737,365 A | * | 4/1998 | Gilbert et al. .............. | 375/224 |
| 6,115,427 A | * | 9/2000 | Calderbank et al. ........ | 375/267 |
| 6,178,196 B1 | * | 1/2001 | Naguib et al. .............. | 375/148 |
| 6,185,258 B1 | * | 2/2001 | Alamouti et al. ........... | 375/260 |
| 6,298,035 B1 | * | 10/2001 | Heiskala ..................... | 370/206 |
| 6,317,411 B1 | * | 11/2001 | Whinnett et al. ........... | 370/204 |
| 6,430,231 B1 | * | 8/2002 | Calderbank et al. ........ | 375/295 |
| 6,473,393 B1 | * | 10/2002 | Ariyavisitakul et al. .... | 370/203 |
| 6,501,803 B1 | * | 12/2002 | Alamouti et al. ........... | 375/265 |

OTHER PUBLICATIONS

S.M. Alamouti; "*A Simple Transmit Diversity Technique for Wireless Communications*", IEEE Journal on Select Areas in Communications, vol. 16, No. 8, Oct. 1998; pp. 1451–1458.

V. Tarokh, H. Jafarkhani, A.R. Calderbank; "*Space–Time Block Codes from Orthogonal Designs*", IEEE Transacions on Information Theory, vol. 45, No. 5, Jul. 1999; pp. 1456–1467.

V. Tarokh, H. Jafarkhani, A.R. Calderbank; "*Space–Time Block Coding for Wireless Communications: Performance Results*"; IEEE Journal on Selected Areas in Communications vol. 17, No. 3, Mar. 1999.

* cited by examiner

*Primary Examiner*—M. Phan
(74) *Attorney, Agent, or Firm*—Kenneth A. Haas

(57) ABSTRACT

A method of operating a communication system including at least two transmitting antennas and at least one receive antenna. Symbols are encoded across the at least two transmitting antennas during a coding interval. Data is received at each receive antenna and at each symbol of the coding interval. Channel gain estimates are provided between each transmitting antenna and each receive antenna at each symbol of the coding interval. An estimate of transmitted symbols is determined based on the channel gain estimates and the received data at each receive antenna at each symbol of the coding interval. An information unit is provided the estimates of the transmitted symbols to achieve spatial diversity in a communication link while mitigating channel variations.

12 Claims, 8 Drawing Sheets

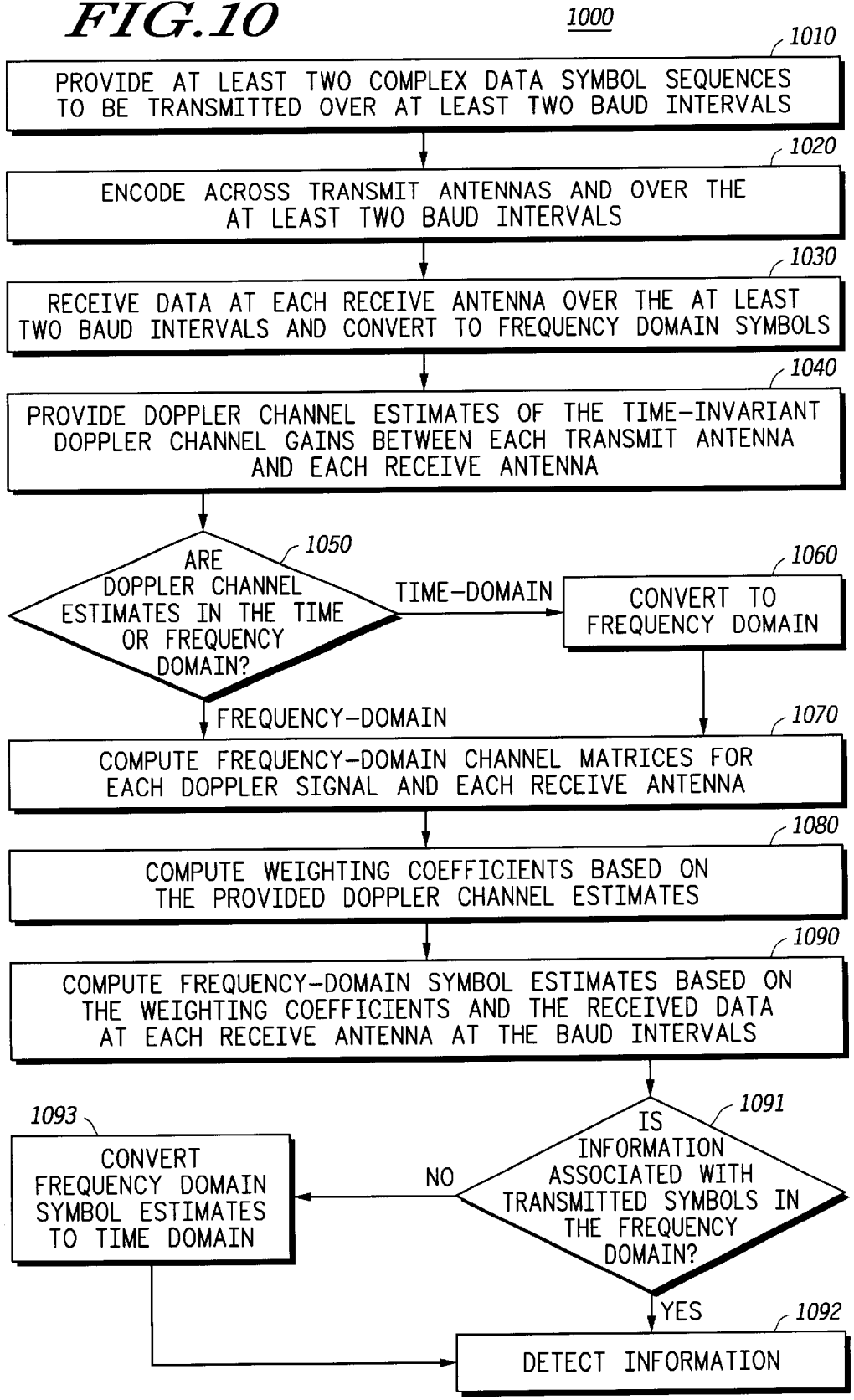

METHOD AND DEVICE FOR EXPLOITING TRANSMIT DIVERSITY IN TIME VARYING WIRELESS COMMUNICATION SYSTEMS

FIELD OF THE INVENTION

The present invention generally relates to the field of communication systems and more particularly, to achieving spatial diversity in a communication link having at least two transmitting antennas and at least one receive antenna while mitigating Doppler induced channel variations and multipath interference.

BACKGROUND OF THE INVENTION

In a wireless communication system, a major design challenge is to maximize system capacity and performance in the presence of interference, and a time-varying multipath channel. A multipath channel is caused by the transmitted signal reflecting off objects near the transmitter and receiver and arriving at the receiver over multiple paths. Interference in a communication system can come from a variety of sources depending on the particular system deployment. If the system is in motion, then Doppler induced channel variations becomes a problem. Interference and multipath are major factors that limit the achievable performance and capacity of a communication system because both effects interfere with the ability of a communication receiver to properly decode the transmitted data.

In a multipath propagation channel, the transmitted signal propagates to the receiver over a finite number $L_{paths}$ of propagation paths, where each path has an associated time delay and complex gain. In such a channel, the communication receiver receives the superposition of $L_{paths}$ delayed, attenuated, and phase-shifted copies of the transmitted signal. The number of paths $L_{paths}$ and their time delays and phase shifts depends on the physical location of the various scattering objects (such as buildings, automobiles, and trees) in the immediate vicinity of the transmitter and receiver. The complex attenuation (magnitude and phase) of each path depends on the length of each path, as well as the material composition of any scatterers or reflectors encountered along the path.

The presence of multipath can severely distort the received signal. In a multipath environment, the multiple copies of the transmitted signal can interfere constructively in some portions of the occupied bandwidth. In other portions of the occupied bandwidth, the multiple copies can interfere destructively at the receiver. This signal duplication causes unwanted variations in the received signal strength over the bandwidth occupied by the signal. Furthermore, if the difference in the path delays of the various propagation paths is significantly greater than the duration of a transmitted information symbol, then intersymbol interference is present at the receiver. When intersymbol interference is present, the received signal is corrupted by prior transmitted symbols propagating over paths having delays relative to the shortest path that are longer than the duration of an information symbol. The demodulation process (the process of determining which information symbol was transmitted) becomes difficult in the presence of intersymbol interference.

In mobile communication systems, the presence of multipath causes rapid variations, or fading of the received signal strength at a receive device. The fading of the received signal can cause the received signal level to drop significantly to levels sometimes reaching 20 dB below the average received signal level. The rate of variation in the transmitted signal is related to the relative velocity of the transmitter and receiver, and to the scattering objects in the environment. These rapid variations in the signal strength can severely interfere with the ability of the receiver to decode the transmitted information.

When more than one antenna is employed at a receiver, the presence of multipath that arrives at the receive array from multiple different directions can cause the signal variations, or fading, on each of the receive antennas to be uncorrelated. In other words, the presence of angular multipath scattering can cause the channel responses between a transmitter and each of the receive antennas to be independent of each other. The result is that the signal level on one receive antenna might be totally unrelated to the signal level on another receive antenna. This means that when one antenna is in a fade (i.e., the signal level has dropped to a very low level), the signal level on another antenna might not be in a fade. Not only does multipath cause the channel response to vary in time (due to motion) and frequency (due to intersymbol interference, as discussed earlier), but multipath can also cause the channel response to vary in space (across the elements of an antenna array).

A well-known practice for combating fading is to use a technique called "diversity." In a generic sense, diversity is the practice of transmitting and/or receiving multiple copies of the signal and combining these copies in some optimal fashion. There are several methods of implementing diversity. One of the more popular forms of diversity is "receive spatial diversity," in which multiple copies of the transmitted signal are received over multiple receive antennas and the outputs of the multiple antennas are combined in some optimal fashion, such as max-ratio combining. (Max ratio combining is the technique where the signals on the receive array are combined to maximize the signal to noise ratio at the output of the receive combiner.) The reason why exploiting receive spatial diversity improves receiver performance can be understood from the following line of reasoning. In a fading environment in which the fading processes are uncorrelated on the receive antennas, it is highly unlikely that all antennas of the receive array will simultaneously experience a severe drop in signal level. As a result, it is highly likely that at least one antenna element of the receive array is not in a fade, which means that at least one receive antenna is receiving a high-powered copy of the transmitted signal. The receiver will have difficulty when all receive antennas simultaneously go into a deep fade because no receive antenna can provide a high-powered version of the transmitted signal, and decoding errors will be highly likely. If the fading processes are all highly correlated, then all receive antennas will tend to go in and out of fades at the same time. When fades do occur in this case; the receiver will have difficulty decoding the signal because all antennas have faded simultaneously.

Another form of diversity similar to receive spatial diversity is "transmit spatial diversity" also called "transmit diversity." Transmit spatial diversity, like receive spatial diversity, can be implemented in many ways. A primitive transmit diversity technique is to use multiple transmit antennas, where each transmit antenna simultaneously transmits the same signal. The receiver (either having a single receive antenna, or even multiple receive antennas) automatically receives the superposition of the two transmitted signals. When the channel responses between each of the transmit antennas and the receive antenna are uncorrelated, then a level of protection against fading can be achieved (for similar reasons as with receive diversity, as described above).

A properly designed transmit diversity scheme can be particularly valuable in a cellular system, especially when the subscriber device has only one receive antenna. In such a case, receive diversity is not an option on the downlink (base transmitting to the subscriber device) due to the single antenna design constraint that is often imposed by cost, size, and marketing requirements. Furthermore, many existing transmit diversity schemes suffer a performance loss when the propagation channel is rapidly varying. A transmit diversity scheme whose performance is not seriously degraded in a rapidly varying channel can also be particularly valuable in a mobile cellular system.

Thus, there is a significant need for a method and device for improved transmit diversity schemes so that the potential benefits of spatial diversity can be realized even when the receive device only has one receive antenna and even when the channel is rapidly varying.

BRIEF DESCRIPTION OF THE DRAWINGS

FIG. 10 is a flow chart representation of one embodiment of the method performed by the communication system of FIG. 1 for transmitting at least two data symbol sequences; and a second embodiment of the method performed by the device of FIG. 2 for determining a symbol estimate for at least two transmitted data symbol sequences in accordance with the present invention.

DETAILED DESCRIPTION OF A PREFERRED EMBODIMENT

Figure 1:
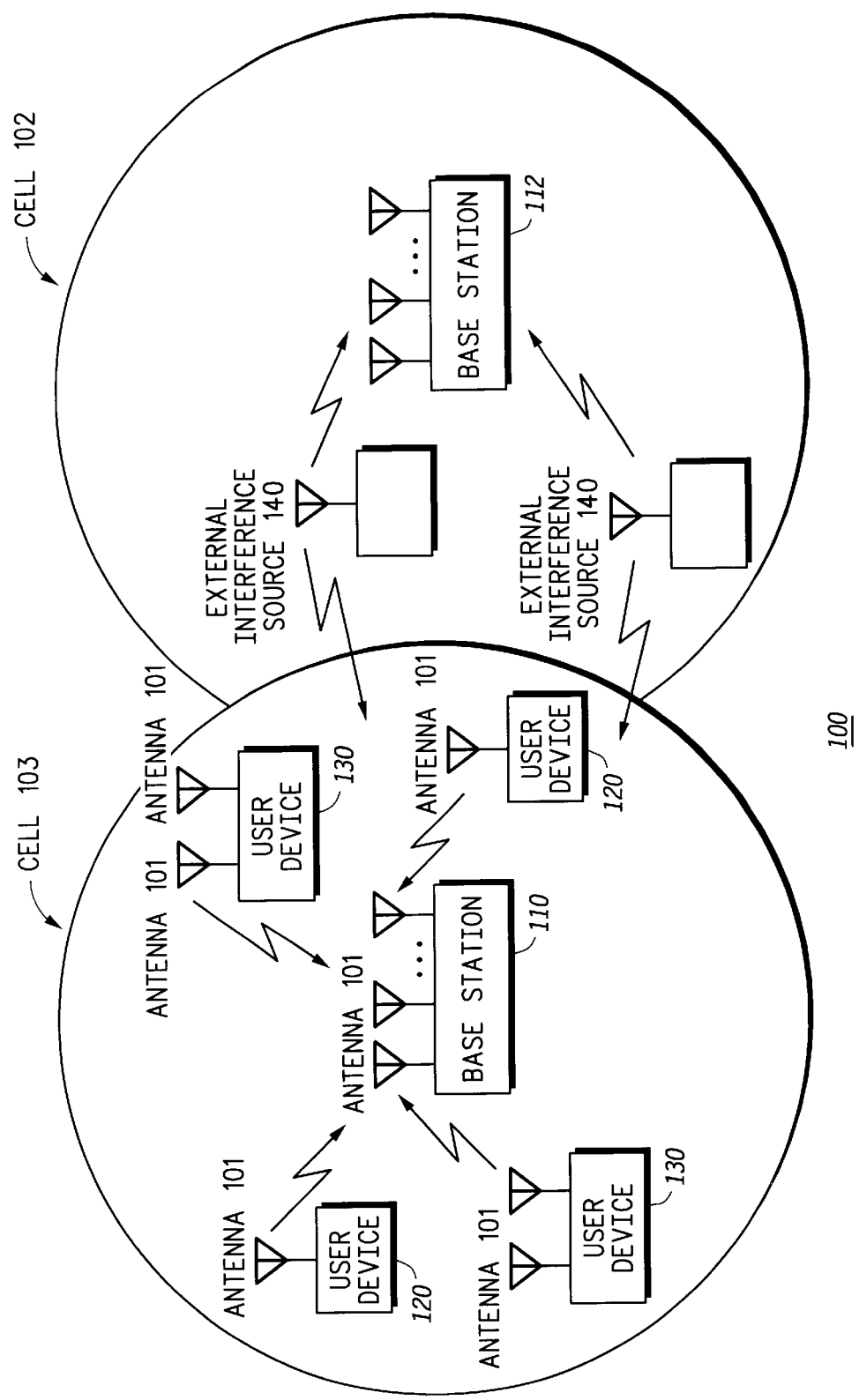
FIG. 1 is an overview diagram of a preferred embodiment of a communication system in accordance with the present invention.

In most scattering environments, antenna diversity is a practical, effective and widely applied technique for reducing the effect of multipath fading. One approach is to use multiple antennas at the receiver and perform combining or selection and switching in order to improve the quality of the received signal. An adaptive antenna array is an array of antennas connected to a communications receiver and operates by combining the signals received by the antennas so as to optimize in an adaptive fashion the receive characteristics of the array. By weighting and then summing the multiple antenna signals, the adaptive antenna array can adapt its angular response, sometimes called the array pattern, as well as its frequency response while it operates in response to changes in the propagation environment. While operating, the adaptive antenna attempts to maximize the reception of the signal received from a desired transmitting device, as it simultaneously minimizes the effects of all other interfering signals and noise. With a properly designed adaptive array combining algorithm, the act of maximizing the reception of the desired signal permits receive spatial diversity to be exploited. In a communication system, an adaptive array's ability to suppress interference and its ability to exploit receive diversity offers the potential to reduce co-channel interference, compensate for Doppler-induced inter-carrier interference, improve coverage quality, and increase overall system capacity.

A problem associated with employing both an equalizer and an adaptive antenna in a wireless communication system lies in the design of an algorithm and device having adequate ability to adapt to changes in the signal environment. For best performance, adaptive antennas that operate in a fast-fading multipath environment must adapt to the rapidly varying channel as well as to any changes in the nature of the desired and interfering signals. In a broadband system, a frequency-selective multipath channel will cause significant variations in the channel across the occupied bandwidth of the received signal. Equalization and interference-suppression algorithms, which cannot track these channel variations in both time and frequency, will suffer significant degradation in performance as measured by the Bit-Error Rate (BER) or Signal-to-Interference-plus-Noise Ratio (SINR).

A common ingredient in many equalizers and adaptive antenna arrays is an algorithm and device that estimates the characteristics of the multipath propagation environment, channel transfer function, or channel frequency response, between the desired transmitting device and each of the at least one receiving antenna at the communication receiver. When transmit spatial diversity is being employed in a broadband system operating in a frequency-selective environment, then an adaptive antenna array generally requires an estimate of the channel frequency response between each receiving antenna and each of the transmitting devices that are simultaneously sending information to the array. The channel estimation algorithm in this case should operate to simultaneously solve for the channel responses of the multiple transmitting devices. Performing a simultaneous estimate of the channel responses of multiple transmitting devices is a difficult operation in a mobile broadband communication system operating in a multipath-rich environment with high frequency selectivity. Strong interference caused by a spatial diversity deployment, Doppler induced Inter-Carrier Interference (ICI), or a low reuse factor causes even more difficulty to the channel estimation algorithms.

Alternatively, another approach for reducing the effect of multipath fading is to use multiple transmit antennas and utilize transmit diversity techniques to improve the quality of the received signal. One such procedure is the Alamouti technique, which with two transmit antennas and one receive antenna achieves a diversity order equal to the case where one transmit antenna is used and the receiver applies maximum-ratio receiver combining (MRRC) with two antennas. The technique may easily be generalized to two transmit antennas and M receive antennas to provide a diversity order of 2M. This is done without any feedback from the receiver to the transmitter and with small computation complexity. The scheme requires no bandwidth expansion, as redundancy is applied in space across multiple antennas, not in time or frequency.

When transmit diversity techniques, such as the Alamouti technique, are employed, the rapidly varying channel poses many of the same difficulties that were described above for receiver processing techniques. It can be shown that when the channel is rapidly varying, the benefits of employing transmit diversity are often not fully realized at the receiver. One of the advantages of the present invention is its ability to track and account for variations in the channel response so that the transmit diversity benefits can be realized even in a rapidly varying channel.

An overview of the Alamouti technique involves two antennas at the transmitter and one or two antennas at the receiver, and is described by equation (1) below. The derivation here is applicable to any time-varying channel, which may include the frequency domain of an OFDM system, or a flat-faded single carrier system, or the frequency domain of a single carrier, TDMA, or CDMA or other similar systems. The information symbol stream to be transmitted is broken up into disjoint pairs of symbols to be transmitted over a coding interval consisting of two symbol intervals. Each pair of symbols is then multiplexed onto two transmit antennas over the two symbol intervals of the coding interval according to the following encoding scheme. During the first symbol interval, the first transmit antenna transmits the first information symbol of the pair, and the second transmit antenna transmits the second information symbol of the pair. During the second symbol interval, the first transmit antenna transmits the negative conjugate of the second information symbol of the pair, and the second transmit antenna transmits the conjugate of the first information symbol of the pair. If $x_i(k)$ is the symbol transmitted out of antenna i at symbol interval k, and s(k) is the (unit-average-power) $k^{th}$ information symbol to be transmitted, the encoding scheme is as follows:

$$x_1(k) = 1/\sqrt{2}\, s(k) \qquad x_2(k) = 1/\sqrt{2}\, s(k+1) \qquad (1)$$
$$x_1(k+1) = 1/\sqrt{2}\, s^*(k+1) \quad x_2(k+1) = 1/\sqrt{2}\, s^*(k)$$

In this encoding scheme, two information symbols are transmitted and received over two symbol intervals. Therefore, no additional bandwidth is used by this scheme. Although not necessary for the proper functioning of the technique, the $1/\sqrt{2}$ in this equation is included so that the average transmit power is the same as when no transmit diversity technique is employed.

To decode the transmitted data stream, the receiver requires knowledge of the channel gain between each transmit antenna and the receive antenna(s). One possible decoding scheme assumes no variation in the channel response over a pair of symbol intervals. With a single antenna at the receiver, the decoding scheme is as follows: Let $A_{ij}$ be the complex channel gain between the $j^{th}$ transmit antenna and the $i^{th}$ receive antenna. Let $y_i(k)$ be the sample received on the $i^{th}$ receive antenna during the $k^{th}$ symbol interval. According to this decoding scheme, a single-antenna receiver computes z(k) and z(k+1) to be an estimate of s(k) and s(k+1), respectively, as follows:

$$\begin{bmatrix} z(k) \\ z(k+1) \end{bmatrix} = \begin{bmatrix} A_{11}^* & A_{12} \\ A_{12}^* & -A_{11} \end{bmatrix} \begin{bmatrix} y_1(k) \\ y_1^*(k+1) \end{bmatrix} \qquad (2)$$

A two-antenna receiver computes z(k) and z(k+1) as follows:

$$\begin{bmatrix} z(k) \\ z(k+1) \end{bmatrix} = \begin{bmatrix} A_{11}^* & A_{12} & A_{21}^* & A_{22} \\ A_{12}^* & -A_{11} & A_{22}^* & -A_{21} \end{bmatrix} \begin{bmatrix} y_1(k) \\ y_1^*(k+1) \\ y_2(k) \\ y_2^*(k+1) \end{bmatrix} \qquad (3)$$

Extending this scheme to more than two receive antennas is straightforward. A 2-transmit antenna, 1-receive antenna system (2Tx,1Rx) using this scheme has the same diversity characteristics as a one transmit antenna, two receive antenna system (1Tx,2Rx) that uses maximal ratio combining. However, the (2Tx,1Rx) Alamouti scheme has 3 dB performance degradation relative to a (1Tx,2Rx) Max Ratio system due to the power back off that must occur with two transmit antennas to make an equitable (i.e., power-equivalent) comparison.

An important aspect of the scheme presented above is that the receive combining scheme assumes a channel that is constant over the two successive symbol intervals of a coding interval. In a highly mobile channel, especially at the higher carrier frequencies, this assumption becomes difficult to maintain. Therefore, the performance of the above decoding scheme in highly mobile channels is diminished.

Briefly described, the present invention is a method and device for calculating the symbol estimates of the signals transmitted by at least two transmitting devices and received on at least one receive antenna. The method and device of the present invention also provides for a simple way of implementing an Alamouti style transmit diversity scheme so that spatial diversity can be achieved via frequency domain receive processing in high speed single carrier systems. The receive processing techniques account for time variations in the channel response and provide much better performance than existing methods which do not account for channel variations. The method of the present invention as is derived from the Alamouti Scheme is as follows:

The following discussion begins by first reviewing the input/output equations for a system in which a transmit array communicates with a receive array. Then system equations are modified to capture the space-time-block coding technique when the channel is varying over the encoding/decoding interval. Given the resulting formulation, a method is presented for decoding the space-time block coding technique in a way that tracks and accounts for the channel variations.

First, consider a system where an $M_{tx}$-element transmit array communicates with an $M_{rx}$-element receive array over a flat time-varying Rayleigh channel. The following equation relates the symbols transmitted by the transmit array to the symbols received at the receive array during symbol interval k:

$$y(k)=A(k)x(k)+n(k) \qquad (4)$$

In this equation, x(k) is the $M_{tx} \times 1$ vector of symbols transmitted by the transmit array during symbol interval k. A(k) is the $M_{rx} \times M_{tx}$ matrix of complex channel gains between the transmit elements and the receive elements. y(k)

is the $M_{rx} \times 1$ vector of symbols received by the receive array during symbol interval k. Finally, n(k) is the $M_{rx} \times 1$ vector of noise samples on the receive array. These quantities are given by:

$$y(k) = \begin{bmatrix} y_1(k) \\ y_2(k) \\ \vdots \\ y_{M_{RX}}(k) \end{bmatrix} \quad A(k) = \begin{bmatrix} A_{11}(k) & A_{12}(k) & \cdots & A_{1M_{TX}}(k) \\ A_{21}(k) & A_{22}(k) & \cdots & A_{2M_{TX}}(k) \\ \vdots & \vdots & \ddots & \vdots \\ A_{M_{RX}1}(k) & A_{M_{RX}2}(k) & \cdots & A_{M_{RX}M_{TX}}(k) \end{bmatrix} \quad (5)$$

$$x(k) = \begin{bmatrix} x_1(k) \\ x_2(k) \\ \vdots \\ x_{M_{TX}}(k) \end{bmatrix} \quad n(k) = \begin{bmatrix} n_1(k) \\ n_2(k) \\ \vdots \\ n_{M_{RX}}(k) \end{bmatrix}. \quad (6)$$

Note that only the spatial domain is captured by the above equations for a transmit and receive array. All matrices and vectors in these equations encompass the space dimension at a specific point in time.

In an Alamouti-style scheme, Equation (4) is still valid, but an overall system equation needs to be derived to capture the combined space-time processing that is inherent in space-time block coding. Consider one coding interval that consists of two symbol intervals k and k+1. In one embodiment, these symbol intervals are in the time domain of a flat faded single carrier system. In another embodiment, these symbol intervals are in the frequency domain of an OFDM or multicarrier system. In yet another embodiment, these symbols are in the frequency domain of a single carrier system in which the receiver is executing frequency-domain receive processing. In yet another embodiment, these symbols are in the frequency domain of a CDMA system where the received data is processed in the frequency-domain. If Equation (1) is combined with Equation (4), the following relationship is obtained, which captures Alamouti's encoding scheme for a single antenna receiver:

$$\begin{bmatrix} y_1(k) \\ y_1^*(k+1) \end{bmatrix} = \quad (7)$$

$$\frac{1}{\sqrt{2}} \begin{bmatrix} A_{11}(k) & A_{12}(k) \\ A_{12}^*(k+1) & -A_{11}^*(k+1) \end{bmatrix} \begin{bmatrix} s(k) \\ s(k+1) \end{bmatrix} + \begin{bmatrix} n_1(k) \\ n_1^*(k+1) \end{bmatrix}$$

For a two-element receive array, the following is obtained:

$$\begin{bmatrix} y_1(k) \\ y_1^*(k+1) \\ y_2(k) \\ y_2^*(k+1) \end{bmatrix} = \quad (8)$$

$$\frac{1}{\sqrt{2}} \begin{bmatrix} A_{11}(k) & A_{12}(k) \\ A_{12}^*(k+1) & -A_{11}^*(k+1) \\ A_{21}(k) & A_{22}(k) \\ A_{22}^*(k+1) & -A_{21}^*(k+1) \end{bmatrix} \begin{bmatrix} s(k) \\ s(k+1) \end{bmatrix} + \begin{bmatrix} n_1(k) \\ n_1^*(k+1) \\ n_2(k) \\ n_2^*(k+1) \end{bmatrix}$$

As mentioned before, the $1/\sqrt{2}$ in these equations is not necessary for the proper functioning of the technique, but is included so that the average power transmitted is the same as other diversity and non-diversity techniques.

Equations (7) and (8) can be simplified as follows:

$$\hat{y}(k) = \frac{1}{\sqrt{2}} H(k)\hat{s}(k) + \hat{n}(k) \quad (9)$$

where for a single element receiver:

$$\hat{y}(k) = \begin{bmatrix} y_1(k) \\ y_1^*(k+1) \end{bmatrix} \quad H(k) = \begin{bmatrix} A_{11}(k) & A_{12}(k) \\ A_{12}^*(k+1) & -A_{11}^*(k+1) \end{bmatrix} \quad (10)$$

$$\hat{s}(k) = \begin{bmatrix} s(k) \\ s(k+1) \end{bmatrix} \quad \hat{n}(k) = \begin{bmatrix} n_1(k) \\ n_1^*(k+1) \end{bmatrix}$$

For a two element receiver:

$$\hat{y}(k) = \begin{bmatrix} y_1(k) \\ y_1^*(k+1) \\ y_2(k) \\ y_2^*(k+1) \end{bmatrix} \quad H(k) = \begin{bmatrix} A_{11}(k) & A_{12}(k) \\ A_{12}^*(k+1) & -A_{11}^*(k+1) \\ A_{21}(k) & A_{22}(k) \\ A_{22}^*(k+1) & -A_{21}^*(k+1) \end{bmatrix} \quad (11)$$

$$\hat{s}(k) = \begin{bmatrix} s(k) \\ s(k+1) \end{bmatrix} \quad \hat{n}(k) = \begin{bmatrix} n_1(k) \\ n_1^*(k+1) \\ n_2(k) \\ n_2^*(k+1) \end{bmatrix}$$

Equation (11) can be rewritten another way:

$$\hat{y}(k) = \frac{1}{\sqrt{2}} H_1(k)s(k) + \frac{1}{\sqrt{2}} H_2(k)s(k+1) + \hat{n}(k) \quad (12)$$

where $H_i(k)$ is the $i^{th}$ column of the matrix H(k). Equations (9) through (12) provide a concise expression that captures the structure of Alamouti's rate one space-time block coding scheme.

Recovering the transmitted symbols s(k) and s(k+1) involves the following linear combining scheme:

$$z(k) = W^H(k)\hat{y}(k), \text{ where } W(k) = [\, w_1(k) \quad w_2(k) \,], \text{ and} \quad (13)$$

$$z(k) = \begin{bmatrix} z(k) \\ z(k+1) \end{bmatrix}$$

where z(k) and z(k+1) are estimates for s(k) and s(k+1), respectively. The receive weight matrix W(k) is dimensioned $2M_{rx} \times 2$.

Combining Equations (12) and (13), results in:

$$z(k) = \frac{1}{\sqrt{2}} w_1^H(k)H_1(k)s(k) + \frac{1}{\sqrt{2}} w_1^H(k)H_2(k)s(k+1) + w_1^H \hat{n}(k) \quad (14)$$

$$z(k+1) = \frac{1}{\sqrt{2}} w_2^H(k)H_1(k)s(k) + \frac{1}{\sqrt{2}} w_2^H(k)H_2(k)s(k+1) + w_2^H \hat{n}(k) \quad (15)$$

Some comments are in order concerning the structure of Equations (9) through (15). First, Equation (12) has a structure similar to a two-user receive SDMA system. In other words, $H_i(k)$ of (12) is analogous to the vector channel response for user i at time k in a receive SDMA system. $\hat{y}(k)$ is analogous to the vector of received samples on the receive array at time k, and $\hat{n}(k)$ is analogous to the vector of noise samples on the receive elements at time k. The quantities s(k) and s(k+1) in (12) are analogous to the user signals transmitted by the two SDMA users, respectively.

Second, if the channel is constant across the two symbol intervals of the coding interval, then the columns of the channel matrix H(k) are orthogonal. A constant channel means $A_{ij}(k)=A_{ij}(k+1)$ for $i,j=\{1,2\}$. The resulting orthogonality permits an easy receive combining scheme whereby $w_i(k)$ is simply chosen to be a scalar multiple of $H_i(k)$ for $i=1,2$. (The scalar multiple is chosen according to the particular detection criterion: i.e., MMSE, ML, etc.). With an orthogonal channel matrix, no component of $s(k+1)$ will be present in the estimate for $s(k)$, and vice versa.

Third, if the channel is not constant across the two symbol intervals of the coding interval, then the columns of the channel matrix H(k) are not orthogonal. The combining scheme where $w_i(k)$ is simply chosen to be a scalar multiple of $H_i(k)$ will result in a component of $s(k+1)$ being left over in the estimate for $s(k)$, and vice versa. As is shown below, this cross-talk results in a bit error floor.

Fourth, the symbol intervals of a coding interval do not necessarily have to be adjacent in time. A coding interval can be made up of symbol intervals that are not adjacent in time or in frequency (when the system is a multicarrier or OFDM system).

The formulation presented above provides the basis for the method of the present invention, which provides a receiver processing algorithm, which handles time-varying channels. The goal of the receiver processing algorithm of the present invention is to recover the information symbols $s(k)$ and $s(k+1)$ by processing the vector of received samples $\hat{y}(k)$. The preferred embodiment of the present invention employs the minimum mean square error criteria to compute a combining weight vector that better handles time varying channels. Other criteria can also be used to determine the frequency-domain information symbols, $s(k)$ and $s(k+1)$, such as joint detection of the frequency-domain information symbols (i.e., the maximum likelihood criteria) and successive cancellation. It can be shown that the receive weight matrix in Equation (13) that minimizes the mean square error between the transmitted symbol vector $\hat{s}(k)$ and the combined output vector $z(k)$ is given by:

$$W(k) = \frac{1}{\sqrt{2}} \left[ \frac{1}{2} H(k) H^H(k) + \sigma^2 I \right]^{-1} H(k) \quad (16)$$

where I is an $2M_{rx} \times 2M_{rx}$ identity matrix and $\sigma^2$ is the noise power at the receive antenna(s). In another preferred embodiment, $\sigma^2 I$ in Equation (16) is replaced by a $2M_{rx} \times 2M_{rx}$ matrix, $R_n(k)$, that is an estimate of the space-time covariance matrix of the interference plus noise at subcarrier k. Equation (16) provides much better performance in mobile channels than when $w_i(k)=\alpha H_i(k)$, (where $\alpha$ is a scalar constant).

It is noted that with a single receive antenna and no channel variations; Equation (16) reduces to the following:

$$W(k) = \frac{\sqrt{2}}{|A_{11}|^2 + |A_{12}|^2 + 2\sigma^2} H(k) \quad (17)$$

With two receive antennas and no channel variations; Equation (16) does not reduce to Alamouti's combining scheme. With two receive antennas, however, the method of setting $W(k)=\alpha H(k)$, where $\alpha$ is a scalar constant, is a zero-forcing (i.e., maximum likelihood) solution, while Equation (16) is an MMSE solution. At high SNRs and constant channels (H(k) having orthogonal columns), the zero forcing and MMSE solutions will have virtually identical performance.

The method outlined above for two transmit elements can be extended to a three and four element rate one-half space-time block code as follows. Begin by reviewing the input/output equations for a system where an $M_{tx}$-element transmit array communicates with an $M_{rx}$-element receive array over a flat Rayleigh channel. The following equation relates the symbols transmitted by the transmit array to the symbols received at the receive array during symbol interval k:

$$y(k)=A(k)x(k)+n(k) \quad (18)$$

In this equation, $x(k)$ is the $M_{tx} \times 1$ vector of symbols transmitted by the transmit array during symbol interval k. $A(k)$ is the $M_{rx} \times M_{tx}$ matrix of complex channel gains between the transmit elements and the receive elements at symbol interval k. $y(k)$ is the $M_{rx} \times 1$ vector of symbols received by the receive array during symbol interval k. Finally, $n(k)$ is the $M_{rx} \times 1$ vector of noise samples on the receive array. These components are written as follows:

$$y(k) = \begin{bmatrix} y_1(k) \\ y_2(k) \\ \vdots \\ y_{M_{RX}}(k) \end{bmatrix} \quad A(k) = \quad (19)$$

$$\begin{bmatrix} A_{11}(k) & A_{12}(k) & \cdots & A_{1M_{TX}}(k) \\ A_{21}(k) & A_{22}(k) & \cdots & A_{2M_{TX}}(k) \\ \vdots & \vdots & \ddots & \vdots \\ A_{M_{RX}1}(k) & A_{M_{RX}2}(k) & \cdots & A_{M_{RX}M_{TX}}(k) \end{bmatrix}$$

$$x(k) = \begin{bmatrix} x_1(k) \\ x_2(k) \\ \vdots \\ x_{M_{TX}}(k) \end{bmatrix} \quad n(k) = \begin{bmatrix} n_1(k) \\ n_2(k) \\ \vdots \\ n_{M_{RX}}(k) \end{bmatrix} \quad (20)$$

In space-time block coding, the complex symbols to be transmitted on each transmit element are some function of a set of K data symbols $s_1$ through $s_K$ that are to be transmitted over P symbol intervals. (The symbols $s_1$ through $s_K$ are typically ordinary QAM or PSK symbols that may or may not already be coded according to some existing (i.e., non-spatial) coding scheme.) Since K data symbols are transmitted over P symbol intervals, the rate of the space-time block code is defined to be K/P. The space-time block code is defined by the $P \times M_{tx}$ code matrix, which specifies how the uncoded data symbols are transformed into the complex symbols to be transmitted out the array. The entries of the code matrix are linear combinations of the K data symbols $s_1$ through $s_K$ and their conjugates. The $(i,j)^{th}$ entry of the code matrix provides an expression that determines the complex symbol that will be transmitted out the $j^{th}$ antenna at symbol interval i within the encoding/decoding interval. For example, the Alamouti 2-Transmitter, Rate-1 space-time block code utilized earlier in this document has a code matrix given by:

$$G_2 = \begin{bmatrix} s_1 & s_2 \\ -s_2^* & s_1^* \end{bmatrix} \quad (21)$$

Half rate codes for three and four transmit elements have code matrices that are given respectively by:

$$G_3 = \begin{bmatrix} s_1 & s_2 & s_3 \\ -s_2 & s_1 & -s_4 \\ -s_3 & s_4 & s_1 \\ -s_4 & -s_3 & s_2 \\ s_1^* & s_2^* & s_3^* \\ -s_2^* & s_1^* & -s_4^* \\ -s_3^* & s_4^* & s_1^* \\ -s_4^* & -s_3^* & s_2^* \end{bmatrix} \quad G_4 = \begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{bmatrix} \quad (22)$$

In both of these two codes, K=4 symbols are transmitted over P=8 symbol intervals, so both codes have a rate equal to one-half.

When the $M_{rx} \times M_{tx}$ matrix of complex channel gains A(k) is changing significantly across the encoding/decoding interval (symbols k=1,2, . . . ,K), decoders that do not track the channel will suffer a significant loss in BER performance.

The following procedure enables the decoder in the present invention to handle channel variation. For a given code matrix, equations must first be set up for the signals received at the receive array in terms of the transmitted data symbols $s_i$ through $s_K$. It turns out that codes $G_2$, $G_3$, and $G_4$ have a special structure that greatly simplifies the expressions for the received signal vectors when the channel is not constant over the P symbol intervals of the encoding/decoding interval. For the $G_2$, $G_3$, and $G_4$ codes, the received signal vector at time k can be shown to be:

$$y(k) = \frac{1}{\sqrt{M_{tx}}} A(k)C(k)s + n(k) \quad k = 1, \ldots, \frac{P}{2} \quad (23)$$

$$y(k) = \frac{1}{\sqrt{M_{tx}}} A(k)C(k)s^* + n(k) \quad k = \frac{P}{2}+1, \ldots, P$$

where $$s = [s_1 \ s_2 \ \ldots \ s_K]^T \quad (24)$$

is the length K vector of unit power uncoded data symbols (e.g., QAM or PSK) to be delivered to the receiver over the P symbol intervals. The inverse square root of the number of transmit antennas is included in (23) because the total power transmitted by the array is normalized to unity. Note that the conjugation of the s vector for k=P/2+1, . . . , P is a result of the lower P/2 rows in the coding matrices being composed only of conjugate values of the data symbols. (The analysis for other codes not having this structure would need modification.) In (23), the P matrices C(k), where k=1. . . P, are of dimension $M_{tx} \times K$ and are determined by inspecting the code matrix of the space-time block code being used. For example, for the $G_2$ code in Equation (21), P=2, and C(1) and C(2) are given by:

$$C(1) = \begin{bmatrix} 1 & 0 \\ 0 & 1 \end{bmatrix} \quad C(2) = \begin{bmatrix} 0 & -1 \\ 1 & 0 \end{bmatrix} \quad (25)$$

For the $G_3$ code of Equation (22), P=8, and the C(k) matrices are defined as follows:

$$C(1) = C(5) = \begin{bmatrix} 1 & 0 & 0 \\ 0 & 1 & 0 \\ 0 & 0 & 1 \end{bmatrix} \quad (26)$$

$$C(2) = C(6) = \begin{bmatrix} 0 & -1 & 0 & 0 \\ 1 & 0 & 0 & 0 \\ 0 & 0 & 0 & -1 \end{bmatrix}$$

$$C(3) = C(7) = \begin{bmatrix} 0 & 0 & -1 & 0 \\ 0 & 0 & 0 & 1 \\ 1 & 0 & 0 & 0 \end{bmatrix}$$

$$C(4) = C(8) = \begin{bmatrix} 0 & 0 & 0 & -1 \\ 0 & 0 & -1 & 0 \\ 0 & 1 & 0 & 0 \end{bmatrix}$$

For the $G_4$ code of Equation (22), P=8, and the C(k) matrices are defined as follows:

$$C(1) = C(5) = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (27)$$

$$C(2) = C(6) = \begin{bmatrix} 0 & -1 & 0 & 0 \\ 1 & 0 & 0 & 0 \\ 0 & 0 & 0 & -1 \\ 0 & 0 & 1 & 0 \end{bmatrix}$$

$$C(3) = C(7) = \begin{bmatrix} 0 & 0 & -1 & 0 \\ 0 & 0 & 0 & 1 \\ 1 & 0 & 0 & 0 \\ 0 & -1 & 0 & 0 \end{bmatrix}$$

$$C(4) = C(8) = \begin{bmatrix} 0 & 0 & 0 & -1 \\ 0 & 0 & -1 & 0 \\ 0 & 1 & 0 & 0 \\ 1 & 0 & 0 & 0 \end{bmatrix}$$

The encoding process for these codes can be summarized as:

$$x(k) = C(k)s \quad k = 1, \ldots, \frac{P}{2} \quad (28)$$

$$x(k) = C(k)s^* \quad k = \frac{P}{2}+1, \ldots, P$$

where x(k), and s are vectors defined in Equations (20) and (24) respectively.

In order to recover the data symbols, a space-time receive vector is created to collect the received array data over the encoding/decoding interval as follows:

$$\hat{y} = \frac{1}{\sqrt{M_{rx}}} Hs + \hat{n} \quad (29)$$

where:

$$\hat{y} = \begin{bmatrix} y(1) \\ y(2) \\ \vdots \\ y\left(\frac{P}{2}\right) \\ y^*\left(\frac{P}{2}+1\right) \\ y^*\left(\frac{P}{2}+2\right) \\ \vdots \\ y^*(P) \end{bmatrix} \quad H = \begin{bmatrix} A(1)C(1) \\ A(2)C(2) \\ \vdots \\ A\left(\frac{P}{2}\right)C\left(\frac{P}{2}\right) \\ A^*\left(\frac{P}{2}+1\right)C\left(\frac{P}{2}+1\right) \\ A^*\left(\frac{P}{2}+2\right)C\left(\frac{P}{2}+2\right) \\ \vdots \\ A^*(P)C(P) \end{bmatrix} \quad (30)$$

$$\hat{n} = \begin{bmatrix} n(1) \\ n(2) \\ \vdots \\ n\left(\frac{P}{2}\right) \\ n^*\left(\frac{P}{2}+1\right) \\ n^*\left(\frac{P}{2}+2\right) \\ \vdots \\ n^*(P) \end{bmatrix}$$

Recovering the transmitted symbols s(k) and s(k+1) involves the following linear combining scheme:

$$z = W^H \hat{y}, \text{ where } W = [w_1\ w_2\ \ldots\ w_K], \text{ and } z = [z_1\ z_2\ \ldots\ z_K]^T \quad (31)$$

where $Z_k$ is an estimate for $s_k$, k=1, ... ,K. The receive weight matrix W is dimensioned $PM_{rx} \times K$. The MMSE solution for the weight matrix is given by:

$$W = \frac{1}{\sqrt{M_{rx}}} \left[ \frac{1}{M_{rx}} HH^H + \sigma^2 I \right]^{-1} H \quad (32)$$

where I is an $PM_{rx} \times PM_{rx}$ identity matrix and $\sigma^2$ is the noise power at the receive antenna(s). In another preferred embodiment, $\sigma^2 I$ in Equation (32) is replaced by a $PM_{rx} \times PM_{rx}$ matrix, $R_n(k)$, that is an estimate of the space-time covariance matrix of the interference plus noise at subcarrier k.

Note that the preferred embodiment of the combining weights of Equation (32) of the present invention is found using the MMSE criteria. Other criteria can also be used to determine the frequency-domain information symbols such as joint detection of the frequency-domain information symbols (i.e., the maximum likelihood criteria) and successive cancellation.

Once these weights are applied to the received data, the resulting combined data would be sent to a detection device for determining the transmitted information. In the case of an OFDM system, the received data is in the frequency domain, and the combined output is also in the frequency domain and is sent to a detection device. However, in the case of a single carrier system using frequency domain processing, the combined frequency domain data would be converted to the time domain with a Discrete Fourier Transform (DFT) or Fast Fourier Transform (FFT) operation, and the resulting time-domain data would be sent to the detection device.

Another embodiment of the present invention involves a single carrier system in which at least two antennas are employed at the transmitter and at least one antenna is employed at the receiver. The time domain of this single carrier system is divided up into successive "bauds," where each baud consists of $L_p$ cyclic prefix symbols followed by N data symbols. The $L_p$ cyclic prefix symbols are a repetition of the last $L_p$ symbols of the N data symbol sequence and are used in a manner analogous to how the cyclic prefix is used in a typical OFDM system. It is assumed that the length of the cyclic prefix is greater than or equal to the length of the effective impulse response of the channel between the transmitter and receiver, which is equal to the length of the RF channel plus twice the number of significant "tails" of the pulse waveform.

Two types of bauds are transmitted in this system: a "pilot baud" or a "data baud." In a pilot baud, the transmitted N-symbol data sequence is known at the receiver and is typically used for channel estimation and other purposes. The N-symbol data sequence transmitted in a data baud carries the information being conveyed between the transmitter and the receiver.

A part of the present invention is the following encoding process in which the transmitter must use two antennas to deliver two independent length N data sequences to the receiver over a two-baud time interval. These two sequences are denoted s[m,b$_1$] and s[m,b$_2$], where m is the time-index variable of the sequence (m=0 ... N−1), and b$_1$ and b$_2$ refer to the first and second sequence, respectively.

In the preferred embodiment, the encoding process of the present invention is as follows. In the data portion of the first baud interval, the first antenna transmits an unmodified copy of the first sequence s[m,b$_1$]. The second antenna transmits an unmodified copy of the second sequence s[m,b$_2$] in the data portion of the first baud interval. In the data portion of the second baud interval, the first antenna transmits a sequence that is a negative, conjugated, time-reversed and circularly shifted (i.e., a modulo N shift) copy of the second information sequence s[m,b$_2$]. In addition, in the data portion of the second baud interval, the second antenna transmits a sequence that is a conjugated, time-reversed and circularly shifted copy of the first information sequence s[m,b$_1$]. Defining x$_j$[m,b$_d$] to be the information sequence transmitted by the j$^{th}$ antenna in data portion of the d$^{th}$ baud, then:

$$x_1[m,b_1] = 1/\sqrt{2}\, s[m,b_1] \quad x_2[m,b_1] = 1/\sqrt{2}\, s[m,b_2]$$

$$x_1[m,b_2] = -1/\sqrt{2}\, s^*[D-m,b_2] \quad x_2[m,b_2] = 1/\sqrt{2}\, s^*[D-m,b_1] \quad (33)$$

where D ($0 \leq D \leq N-1$) is an integer that causes an arbitrary circular shift of the sequence by D symbols. For example, for D=0, the contents of the data portion within the second baud interval on the first antenna are given as:

$$-1/\sqrt{2}[s^*[0,b_1]\ s^*[N-1,b_1]\ s^*[N-2,b_1] \ldots s^*[1,b_1]] \quad (34)$$

For example, for D=N−1, the contents of the data portion within the second baud interval on the first antenna are given as:

$$-1/\sqrt{2}[s^*[N-1,b_1]\ s^*[N-2,b_1]\ s^*[N-3,b_1] \ldots s^*[0,b_1]] \quad (35)$$

For other values of D (i.e., 0<D<N−1), the contents of the data portion within the second baud interval on the first antenna are given as:

$$-1/\sqrt{2}[s^*[D,b_1]\ s^*[D-1,b_1] \ldots s^*[0,b_1]\ s^*[N-1,b_1]\ s^*[N-2,b_1] \ldots s^*[D+1,b_1]] \quad (36)$$

Equations (34) through (36) can be rewritten to show the contents of the second baud interval on the second antenna in accordance with (33). It will be shown below that the value of D does not affect performance as long as the receiver knows what value of D is being used by the transmitter.

Once the data portions of the two baud intervals are determined according to (33), the last $L_p$ symbols of the data portion are copied to the beginning of the baud interval to form the cyclic prefix. Note that the inverse of the square root of 2 is included in (33) to make the total power transmitted by the two element array equivalent to a single antenna that transmits the two symbol sequences without any transmit diversity scheme.

At the receiver, N samples are collected and sent to an FFT for the frequency domain processing. Let $y_i[m,b]$ be the length N data sequence (m=0,1, . . . ,N−1) received by the $i^{th}$ receive antenna during the $b^{th}$ baud interval. It is assumed that the time sample corresponding to sample m=0 corresponds to $t=-N_pT_s$, where $T_s$ is the symbol duration, $N_p$ is the number of significant non-causal "tails" of the pulse shaping waveform, and t=0 is defined to be the time sample of the first symbol of the data portion of the baud of the earliest multipath component. Choosing the N sampling times in this manner causes the effective impulse response between the transmitter and receiver to be causal even though the transmitted waveform is technically non-causal due to the non-causal tails of the pulse waveform. Given the use of a cyclic prefix greater than or equal to the length of the effective impulse response, $y_i[m,b]$ can be shown to be:

$$y_i[m, b] = \sum_{j=1}^{J} \sum_{n=0}^{L_p-1} \hat{h}_{ij}[n] x_j[m-n, b] \quad (37)$$

where J denotes the number of transmit antennas (two in this case) and $$\hat{h}_{ij}[n] = h((n-N_p)T_s) \quad (38)$$

and h(t) is the convolution of the transmit and receive pulse shaping filters and the RF channel. In the frequency domain, the received data has the following form:

$$Y_i[k, b] = \sum_{m=0}^{N-1} y_i[m, b] e^{-j2\pi km/N} = \sum_{j=1}^{J} H_{ij}[k, b] X_j[k, b] \quad (39)$$

where $$X_j[k, b] = \sum_{m=0}^{N-1} x_j[m, b] e^{-j2\pi km/N} \quad (40)$$

and $$H_{ij}[k, b] = \sum_{m=0}^{L_p-1} \hat{h}_{ij}[m, b] e^{-j2\pi km/N} \quad (41)$$

Given the encoding scheme in Equation (33), Equation (40) becomes $$\begin{aligned} X_1[k, b_1] = \frac{1}{\sqrt{2}} S[k, b_1] & \quad X_2[k, b_1] = \frac{1}{\sqrt{2}} S[k, b_2] \\ X_1[k, b_2] = & \quad X_2[k, b_2] = \\ -\frac{1}{\sqrt{2}} e^{-j2\pi Dk/N} S^*[k, b_2] & \quad \frac{1}{\sqrt{2}} e^{-j2\pi Dk/N} S^*[k, b_1] \end{aligned} \quad (42)$$

where $$S[k, b] = \sum_{m=0}^{N-1} s[m, b] e^{-j2\pi km/N} \quad (43)$$

When $M_{rx}$ receive antennas are used with the encoding scheme of (33), the received data can be expressed as follows:

$$\hat{Y} = \frac{1}{\sqrt{2}} \hat{H} S + \hat{N} \quad (44)$$

where the following definitions are used:

$$\hat{Y} = \begin{bmatrix} Y[k, b_1] \\ Y^*[k, b_2] \end{bmatrix}, \quad (45)$$

$$\hat{H} = \begin{bmatrix} H_1[k, b_1] & H_2[k, b_1] \\ H_2^*[k, b_2] e^{j2\pi Dk/N} & -H_1^*[k, b_2] e^{j2\pi Dk/N} \end{bmatrix},$$

$$S = \begin{bmatrix} S[k, b_1] \\ S[k, b_2] \end{bmatrix}, \hat{N} = \begin{bmatrix} N[k, b_1] \\ N^*[k, b_2] \end{bmatrix}$$

$$Y[k, b] = \begin{bmatrix} Y_1[k, b] \\ Y_2[k, b] \\ \vdots \\ Y_{M_{rx}}[k, b] \end{bmatrix}, H_j[k, b] = \begin{bmatrix} H_{1j}[k, b] \\ H_{2j}[k, b] \\ \vdots \\ H_{M_{rx}j}[k, b] \end{bmatrix}, \quad (46)$$

$$N[k, b] = \begin{bmatrix} N_1[k, b] \\ N_2[k, b] \\ \vdots \\ N_{M_{rx}}[k, b] \end{bmatrix}$$

The frequency-domain transmitted symbol sequences are estimated by the receiver as:

$$Z[k, b] = W^H \hat{Y}, \text{ where } W = [w_1 \; w_2], \text{ and} \quad (47)$$

$$Z[k, b] = \begin{bmatrix} Z(k, b_1) \\ Z(k, b_2) \end{bmatrix}$$

where the MMSE-based decoder for this system is to choose the W matrix according to:

$$W = \frac{1}{\sqrt{2}} \left[ \frac{1}{2} \hat{H} \hat{H}^H + \sigma^2 I \right]^{-1} \hat{H} \quad (48)$$

where I is an $2M_{rx} \times 2M_{rx}$ identity matrix and $\sigma^2$ is the frequency-domain noise power on a frequency bin. In another preferred embodiment, $\sigma^2 I$ in Equation (48) is replaced by a $2M_{rx} \times 2M_{rx}$ matrix, $R_n(k)$, that is an estimate of the space-time covariance matrix of the interference plus noise at subcarrier k.

With the exception of the exponential terms $e^{j2\pi Dk/N}$ in (45), the encoding scheme of the present invention embodied by Equation (33) has caused Equations (44) through (48) to be identical to the equations described earlier for a generic flat-faded transmit diversity system. Note that if D is zero, the exponential terms in (45) will equal one and drop out of the equation. Also, note that if $H_j[k,b_1]=H_j[k,b_2]$ for j=1,2, then the two columns of $\hat{H}$ are orthogonal regardless of the value of D. The value of D, therefore, will not affect the attainable diversity benefits of the proposed scheme.

If the integer shift factor D is not equal to 0, then the receiver has two choices for accounting for the nonzero value of D. The first choice is to incorporate the exponential terms $e^{j2\pi Dk/N}$ in (45). The second choice is based on the observation that an exponential phase shift in the frequency domain is equivalent to a circular shift in the time-domain. Therefore, the second choice is to circularly shift the received data vector (37) by D before carrying out the FFT. D can then be set to zero in the frequency domain equations of (45).

If there are three transmitters, then an encoding strategy for an embodiment of the present invention in a single carrier system having cyclic prefixes is given as follows:

$$
\begin{aligned}
x_1[m, b_1] &= s[m, b_1] & x_2[m, b_1] &= s[m, b_2] & x_3[m, b_1] &= s[m, b_3] \\
x_1[m, b_2] &= -s[m, b_2] & x_2[m, b_2] &= s[m, b_1] & x_3[m, b_2] &= -s[m, b_4] \\
x_1[m, b_3] &= -s[m, b_3] & x_2[m, b_3] &= s[m, b_4] & x_3[m, b_3] &= s[m, b_1] \\
x_1[m, b_4] &= -s[m, b_4] & x_2[m, b_4] &= -s[m, b_3] & x_3[m, b_4] &= s[m, b_2] \\
x_1[m, b_5] &= s^*[D-m, b_1] & x_2[m, b_5] &= s^*[D-m, b_2] & x_3[m, b_5] &= s^*[D-m, b_3] \\
x_1[m, b_6] &= -s^*[D-m, b_2] & x_2[m, b_6] &= s^*[D-m, b_1] & x_3[m, b_6] &= -s^*[D-m, b_4] \\
x_1[m, b_7] &= -s^*[D-m, b_3] & x_2[m, b_7] &= s^*[D-m, b_4] & x_3[m, b_7] &= s^*[D-m, b_1] \\
x_1[m, b_8] &= -s^*[D-m, b_4] & x_2[m, b_8] &= -s^*[D-m, b_3] & x_3[m, b_8] &= s^*[D-m, b_2]
\end{aligned}
\quad (49)
$$

If there are four transmitters, then an encoding strategy for an embodiment of the present invention in a single carrier system having cyclic prefixes is given as follows:

$$
\begin{aligned}
x_1[m, b_1] &= s[m, b_1] & x_2[m, b_1] &= s[m, b_2] & x_3[m, b_1] &= s[m, b_3] & x_4[m, b_1] &= s[m, b_4] \\
x_1[m, b_2] &= -s[m, b_2] & x_2[m, b_2] &= s[m, b_1] & x_3[m, b_2] &= -s[m, b_4] & x_4[m, b_2] &= s[m, b_3] \\
x_1[m, b_3] &= -s[m, b_3] & x_2[m, b_3] &= s[m, b_4] & x_3[m, b_3] &= s[m, b_1] & x_4[m, b_3] &= -s[m, b_2] \\
x_1[m, b_4] &= -s[m, b_4] & x_2[m, b_4] &= -s[m, b_3] & x_3[m, b_4] &= s[m, b_2] & x_4[m, b_4] &= s[m, b_1] \\
x_1[m, b_5] &= s^*[D-m, b_1] & x_2[m, b_5] &= s^*[D-m, b_2] & x_3[m, b_5] &= s^*[D-m, b_3] & x_4[m, b_5] &= s^*[D-m, b_4] \\
x_1[m, b_6] &= -s^*[D-m, b_2] & x_2[m, b_6] &= s^*[D-m, b_1] & x_3[m, b_6] &= -s^*[D-m, b_4] & x_4[m, b_6] &= s^*[D-m, b_3] \\
x_1[m, b_7] &= -s^*[D-m, b_3] & x_2[m, b_7] &= s^*[D-m, b_4] & x_3[m, b_7] &= s^*[D-m, b_1] & x_4[m, b_7] &= -s^*[D-m, b_2] \\
x_1[m, b_8] &= -s^*[D-m, b_4] & x_2[m, b_8] &= -s^*[D-m, b_3] & x_3[m, b_8] &= s^*[D-m, b_2] & x_4[m, b_8] &= s^*[D-m, b_1]
\end{aligned}
$$

In these two equations, D is as was defined earlier, and $x_j[m,b]$ is the sequence to be transmitted out antenna j during baud interval b, and s[m,b] is the $b^{th}$ sequence to be delivered to the receiver. These time-domain encoding strategies for three and four elements cause the frequency domain of the single carrier system to be encoded in a manner similar to the G3 and G4 codes described earlier. As a result, it is straightforward to extend the derivation of the receiver decoding strategy outlined above for the two element case to these two encoding strategies. Other encoding schemes are also in the spirit of this embodiment of the invention because to implement a conjugation that is required by an encoding scheme, the time domain sequence to be transmitted is simply conjugated and time-reversed as can be seen by inspecting the both the code matrix G3 and G4 and equations (49) and (50). This time reversal and conjugation technique acts to conjugate the frequency domain symbol as is required by the encoding scheme.

The second part of the invention involves another embodiment of a single carrier system in which at least two antennas are employed at the transmitter and at least one antenna is employed at the receiver. The single carrier system in this second part of the invention is similar to the single carrier system in the first part of the invention, except that null cyclic prefixes are used, rather than cyclic prefixes, as is described in the following. The time domain of this single carrier system is divided up into successive "bauds," where each baud consists of K data symbols followed by Lcp zero symbols. The Lcp zero symbols are the "Null Cyclic Prefix" and are used in a way analogous to the way cyclic prefixes are used in a typical OFDM system or a cyclic prefix single carrier system described earlier. The receiver is assumed to process each received baud in the frequency domain by first taking an N=K+Lcp size FFT of each baud.

A part of the present invention is an encoding process for this null cyclic prefix single carrier system in which the transmitter must use its two antennas to deliver two independent length K sequences to the transmitter over a two baud time interval. These two sequences are denoted $s[m,b_1]$ and $s[m,b_2]$, where m is the time-index variable of the sequence (m=0 . . . K−1), and $b_1$ and $b_2$ refer to the first and second sequence.

A preferred embodiment of the encoding process of the present invention is as follows. In the data portion of the first baud, the first antenna transmits an unmodified copy of the first sequence $s[m,b_1]$. The second antenna transmits an unmodified copy of the second sequence $s[m,b_2]$ in the data portion of the baud. (Both antennas are transmitting different information sequences on each baud). In the data portion of the second baud, the first antenna transmits a sequence that is a negative, conjugated, and time-reversed copy of the second information sequence $s[m,b_2]$. The second antenna transmits a sequence that is a conjugated and time-reversed copy of the first information sequence $s[m,b_1]$. If $x_j[m,b]$ is defined to be the information sequence transmitted by the $j^{th}$ antenna in data portion of the $b^{th}$ baud, then:

$$x_1[m, b_1] = \frac{1}{\sqrt{2}} s[m, b_1] \quad x_2[m, b_1] = \frac{1}{\sqrt{2}} s[m, b_2] \tag{51}$$

$$x_1[m, b_2] = \quad\quad x_2[m, b_2] =$$

$$-\frac{1}{\sqrt{2}} s^*[K-1-m, b_2] \quad \frac{1}{\sqrt{2}} s^*[K-1-m, b_1]$$

Note that the inverse of the square root of 2 is included to make the total power transmitted by the two element array equivalent to a single antenna that transmits the same symbol streams. Also, the reasoning behind this encoding system is so that when the receiver converts the received samples on the two baud intervals into the frequency domain, the resulting frequency-domain symbols have characteristics similar to the original encoding scheme described above for regular cyclic prefix single carrier and OFDM. Further, note that the conjugate time-reversal operation in the time-domain causes the frequency domain symbols of that baud to be conjugated. As a result, two symbols that are on the same frequency bin (a.k.a. subcarrier) of the two baud intervals are paired together to form a coding interval residing in the frequency domain and the frequency domain symbols of the resulting frequency domain coding interval will end up being encoded in a manner similar to the original Alamouti scheme.

At a receive antenna, the received sample-stream on each baud is converted to the frequency domain by taking an N-point FFT of the length N sequence received over the entire baud (including both the data portion and the null cyclic prefix. The received symbol sequence is the sum of contributions from each transmit antenna, where each contribution is a convolution of the time-varying time-domain impulse response and the transmitted symbol stream. The null cyclic prefix causes this convolution to be a circular convolution.

In the transmission scheme presented above, the receiver has the option of processing the received frequency-domain symbols in a way virtually identical to the Space-Time Diversity method described earlier. First, if the N received symbols on the second baud are directly FFT'd into the frequency domain, then the frequency domain symbols of the second baud will have an extra phase shift that would need to be accounted for. However, this phase shift can be eliminated by first right-circular shifting the N received samples by Lcp-1 samples and then FFT-ing the resulting sequence into the frequency domain. Once this is done, the received frequency domain symbols can be processed identically to the methods described in Part 1 of the invention. The processed frequency domain symbols are then Inverse Fast Fourier Transformed (IFFT'd) into the time domain, where they will be detected by the receiver. Second, the methods of the first part of this invention assume the channel does not vary substantially over a baud interval, but that variations can occur from baud to baud. These methods require an estimate of the channel at each frequency domain symbol in the coding interval.

A new alternative to the methods described above is described as follows. This part of the invention assumes that the Least-Squares Delay/Doppler (LS-DD) channel estimates are employed to allow the receiver to track variations in the channel that occur not only from baud-to-baud, but within a baud interval as well. The LS-DD methods produce an estimate of the time-invariant Doppler Channel Gains $H_{ijv}(k)$, which is the v'th Doppler channel gain between transmit antenna i and transmit antenna j at frequency bin k.

Given the estimates for the Doppler Channel Gains, this part of the invention tackles the problem of computing linear combining weights for combining the received frequency-domain samples so that the transmitted symbol sequences can be recovered. The mathematics behind the weight computation is presented as follows.

The time-domain data received on each of the $M_{rx}$ receive antennas is sampled at the symbol rate. The $M_{rx} \times 1$ vector of received data samples at time sample n is:

$$y(n) = \sum_{j=1}^{J} h_j(l, n) * x_j(n) + n(n) \tag{52}$$

where $h_j(l,n)$ is the $M_{rx} \times 1$ vector of time-varying impulse responses between the $j^{th}$ transmitting element and each of the $M_{rx}$ receive elements at the $n^{th}$ time sample. The variable J denotes the number of transmit antennas. $x_j(n)$ is the time-domain symbol transmitted at time sample n by the $j^{th}$ transmitting antenna, and n(n) is the vector of noise samples at time sample n on the receive antennas.

The Doppler channel estimator assumes the time-varying $M_{rx} \times 1$ vector multipath channel for the $j^{th}$ transmitting element can be accurately modeled as the weighted sum of 2 V+1 time-invariant impulse responses vectors $h_{jv}(l)$, (v=−V, . . . ,0, . . . +V), called "Doppler impulse response vectors." According to this model, Equation (52) can be written as $$y(n) = \sum_{j=1}^{J} \sum_{v=-V}^{+V} h_{jv}(l) * x_j(n) e^{j2\pi v n / N_k} + n(n) \tag{53}$$

where, $N_k$ is the "effective" DFT size for the Doppler model. Given the channel model in (53), the actual time-varying impulse response can be expressed in terms of the time-invariant Doppler impulse response vectors according to:

$$h_j(l, n) = \sum_{v=-V}^{+V} h_{jv}(l) e^{j2\pi v(n-l)/N_k} \approx \sum_{v=-V}^{+V} h_{jv}(l) e^{j2\pi v n / N_k} \tag{54}$$

The Doppler channel estimation procedure estimates a set of $h_{jv}(l)$ that approximates the actual time-varying impulse response $h_j(l,n)$ according to Equation (54). It should be noted that the time variations of the channel are captured by the exponential weighting factors $e^{j2\pi v n/N_k}$, in equations (53) and (54). The Doppler channel estimation process produces estimates of the time-invariant Doppler impulse responses $h^{ijv}(l)$ under the assumption that the actual time-varying channel impulse response is then recovered through equation (54). Therefore, the time index value n in the exponential weighting factor of Equations (16) and (17) must be viewed as being referenced to an absolute time reference point, such as the first time sample of the first baud in a burst. Therefore, and more importantly, when the N-point FFT is taken of a particular baud, as will be discussed in the analysis below, the absolute time reference of these exponential weighting factors must be preserved.

To facilitate the analysis under these constraints, some notation is introduced. Let y[m,b] be the vector of samples received by the $M_{rx}$ receive antennas at the $m^{th}$ sample time (m=0 . . . N−1) during the $b^{th}$ baud interval.

$$y[m, b] = \begin{cases} y(n_b + m) & \text{for } m = 0 \ldots N - 1 \\ 0 & \text{otherwise} \end{cases} \quad (55)$$

where $n_b$ is the absolute time index of the first sample of the $b^{th}$ baud. The variable $x_j[m,b]$ was previously defined in a similar manner:

$$x_j[m, b] = \begin{cases} x(n_b + m) & \text{for } m = 0 \ldots N - 1 \\ 0 & \text{otherwise} \end{cases} \quad (56)$$

Substituting Equation (53) into (55) results in the following expression for $y[m,b]$ (for $m=0 \ldots N-1$ only):

$$y[m, b] = \sum_{j=1}^{J} \sum_{v=-V}^{+V} h_{jv}(l) \otimes x_j[m, b] e^{j 2\pi v n_b / N_k} e^{j 2\pi v n / N_k} + n(n_b + m) \quad (57)$$

The null prefix in the transmitted data causes the convolution in (57) to be a modulo N circular convolution (denoted by $\otimes$).

In the frequency domain, the $M_{rx} \times 1$ vector of received samples on the $k^{th}$ frequency bin of the $b^{th}$ baud is:

$$Y[k, b] = \sum_{m=0}^{N-1} y[m, b] e^{-j 2\pi m k / N} \quad (58)$$

Equation (58) can be shown to be:

$$Y[k, b] = \sum_{j=1}^{J} \sum_{v=-V}^{+V} H_{jv}(k) X_{jv}[k, b] e^{j 2\pi v n_b / N_k} \quad (59)$$

with the following definitions:

$$H_{jv}(k) = \sum_{l=0}^{L-1} h_{jv}(l) e^{-j 2\pi l k / N} \quad (60)$$

$$X_{jv}[k, b] = \sum_{m=0}^{K-1} x_j[m, b] e^{j 2\pi v n / N_k} e^{-j 2\pi v n k / N} \quad (61)$$

The decoding scheme will process the two frequency-domain symbols received on the $k^{th}$ frequency bin of two adjacent bauds $b_1$ and $b_2$ on all receive antennas. At this point, (51) is substituted into (61) so that (54) can be expressed in terms of the two time-domain transmitted sequences $s[m,b_1]$ and $s[m,b_2]$ that are to be recovered at the receiver. For frequency bin k and baud intervals $b_1$ and $b_2$, the received frequency domain data vector to be processed can be shown to have the following form:

$$Y_i(k) = \sum_{v=-V}^{+V} H_{iv}(k) S_v(k) + n(k) \quad (62)$$

In this equation, the following definitions apply:

$$Y_i(k) = \begin{bmatrix} Y_i[k, b_1] \\ Y_i^*[k, b_2] \end{bmatrix} \quad (63)$$

$Y_i[k,b]$ is the received frequency domain symbol on the $i$'th receive antenna, k'th frequency bin and b'th baud.

$$H_{iv}(k) = \quad (64)$$

$$\begin{bmatrix} H_{i1v}(k) e^{\frac{j 2\pi n_{b1}}{N_k}} & H_{i2v}(k) e^{\frac{j 2\pi n_{b1}}{N_k}} \\ H_{i2v}^*(k) e^{-\frac{j 2\pi v(n_{b2}+K-1)}{N_k}} e^{\frac{j 2\pi k(K-1)}{N}} & -H_{i1v}^*(k) e^{-\frac{j 2\pi v(n_{b2}+K-1)}{N_k}} e^{\frac{j 2\pi k(K-1)}{N}} \end{bmatrix}$$

$$S_v(k) = \begin{bmatrix} S_v[k, b_1] \\ S_v[k, b_2] \end{bmatrix}$$

is the vector of the v'th Doppler signals of the frequency-domain transmitted sequences, where:

$$S_v[k, b_d] = \sum_{m=0}^{K-1} s[m, b_d] e^{j \frac{2\pi v m}{N_k}} e^{-j \frac{2\pi v n k}{N}} \quad (65)$$

and $$n_i(k) = \begin{bmatrix} n_i[k, b_1] \\ n_i[k, b_2] \end{bmatrix}$$

is the vector of frequency-domain noise samples on the i'th antenna at frequency bin k, bauds $b_1$ and $b_2$.

For multiple receive antennas, the received data has the following form:

$$Y(k) = \sum_{v=-V}^{+V} H_v(k) S_v(k) + N(k), \, H_v(k) = \begin{bmatrix} H_{1v}(k) \\ H_{2v}(k) \\ \vdots \\ H_{M_{RX} v}(k) \end{bmatrix},$$

$$Y(k) = \begin{bmatrix} Y_1(k) \\ Y_2(k) \\ \vdots \\ Y_{M_{RX}}(k) \end{bmatrix}, \, N(k) = \begin{bmatrix} n_1(k) \\ n_2(k) \\ \vdots \\ n_{M_{RX}}(k) \end{bmatrix}$$

The receive algorithm computes two combining weight vectors that will both combine the frequency-domain symbols received on a frequency bin (e.g., k'th subcarrier) of two adjacent baud intervals (e.g., $b_1$ and $b_2$). The first combining weight vector is intended to recover the frequency-domain symbol of the k'th bin of the first transmitted sequence $s[m,b_1]$. The second combining weight vector is intended to recover the frequency domain symbol of the k'th bin of the second transmitted sequence $s[m,b_2]$.

The idea behind the combiner is to produce two combined frequency-domain symbols $z[k,b1]$ and $z[k,b2]$ as follows.

$$Z[k, b_1] = w_1^H(k) Y(k) \quad (66)$$

$$Z[k, b_2] = w_2^H(k) Y(k)$$

The goal behind the combining operation is to make $Z[k,b_1]$ equal to $S_0[k,b_1]$ and to make $Z[k,b_2]$ equal to $S_0[k,b_2]$. Inspecting the equation for the Doppler signals given above, it can be seen that $S_0[k,b_1]$ and $S_0[k,b_2]$ are the frequency-domain symbols at the k'th frequency bin of the first and second transmitted time-domain sequences.

To solve for the weights, an MMSE calculation is carried out. For each subcarrier of the two-baud coding interval, the MMSE solution to $w_1$ and $w_2$ is given by:

$$w_1(k) = \frac{1}{\sqrt{2}}\left[\frac{1}{2}R(k) + \sigma^2 I\right]^{-1} P_1(k), \text{ and} \quad (67)$$

$$w_2(k) = \frac{1}{\sqrt{2}}\left[\frac{1}{2}R(k) + \sigma^2 I\right]^{-1} P_2(k)$$

$$R(k) = \sum_{v=-V}^{+V} \sum_{w=-V}^{+V} H_v(k) H_w^H(k) \alpha(v - w), \quad (68)$$

$$P_1(k) = \sum_{v=-V}^{+V} H_v(k)\begin{bmatrix} \alpha(v) \\ 0 \end{bmatrix}, \quad P_2(k) = \sum_{v=-V}^{+V} H_v(k)\begin{bmatrix} 0 \\ \alpha(v) \end{bmatrix} \quad (69)$$

$$\alpha(v) = e^{j\frac{2\pi(K-1)v}{N_k}} \frac{\sin[\pi vK/N_k]}{\sin[\pi v/N_k]} \quad (70)$$

In (67) I is an $2M_{rx} \times 2M_{rx}$ identify matrix and $\sigma^2$ is the frequency-domain noise power on a frequency bin. In another preferred embodiment, $\sigma^2 I$ in Equation (67) is replaced by a $2M_{rx} \times 2M_{rx}$ matrix, $R_n(k)$, that is an estimate of the space-time covariance matrix of the interference plus noise at subcarrier k. After (67) and (66) are performed, the combined frequency-domain symbols are IFFT'd into the time domain for detection. It should also be pointed out that the quantities in Equations (67) through (69) are functions of the baud intervals $b_1$ and $b_2$.

Once the received pair of frequency domain symbols are combined with the above combining weights, the combined frequency-domain symbols are IFFT'd back into the time domain, where the resulting symbol sequence is detected. Due to its ability to track and account for variations in the channel response occurring within a baud interval, this technique performs better than the methods of part 1 in highly variable channels, but is more mathematically complex.

At this point, some comments are in order concerning Equations (62) through (70). First, if a constant channel is assumed (no time variations), then V is properly chosen to be 0. In this case, this set of equations will contain only the v=0 term and will reduce down to the original system equations for Alamouti's transmit diversity scheme (applied in the frequency domain) with the exception of a frequency-domain phase shift term in (64). This extra frequency-domain phase shift term ($e^{j2\pi k(K-1)/N}$) is equivalent doing a left circular shift by K−1 samples of the N received time-domain samples of baud $b_2$ prior to doing the FFT. Therefore, if the receiver performs this circular shift operation on baud $b_2$ before doing the FFT, then the $e^{j2\pi k(K-1)/N}$ terms will not appear in (64), and the equations when V=0 are identical to a frequency-domain application of Alamouti's original scheme.

Second, in this single carrier system having null cyclic prefixes, the receiver has the option of combining the received frequency-domain symbols in a way virtually identical to the methods described in the first part of this invention. If the aforementioned circular shift operation is performed on baud $b_2$, then any set of frequency-domain channel estimates can be used to compute the frequency-domain combining weights exactly as was described earlier.

Third, it is important to note that the methods described in the first part of this invention assume the channel does not vary substantially over a baud interval, but that variations can occur from baud to baud. Those methods will simply require a single channel gain estimate at each received frequency domain symbol in the coding interval. The formulation in Equations (64) through (70) provides the ability to account for variations that occur both within a baud interval as well as for variations that occur from baud to baud.

For the embodiment of the present invention, which operates in a null-cyclic prefix single carrier system, if there are three transmitters, then an encoding strategy is as follows:

$$x_1[m, b_1] = s[m, b_1] \quad (71)$$
$$x_1[m, b_2] = -s[m, b_2]$$
$$x_1[m, b_3] = -s[m, b_3]$$
$$x_1[m, b_4] = -s[m, b_4]$$
$$x_1[m, b_5] = s^*[K - 1 - m, b_1]$$
$$x_1[m, b_6] = -s^*[K - 1 - m, b_2]$$
$$x_1[m, b_7] = -s^*[K - 1 - m, b_3]$$
$$x_1[m, b_8] = -s^*[K - 1 - m, b_4]$$
$$x_2[m, b_1] = s[m, b_2]$$
$$x_2[m, b_2] = s[m, b_1]$$
$$x_2[m, b_3] = s[m, b_4]$$
$$x_2[m, b_4] = -s[m, b_3]$$
$$x_2[m, b_5] = s^*[K - 1 - m, b_2]$$
$$x_2[m, b_6] = s^*[K - 1 - m, b_1]$$
$$x_2[m, b_7] = s^*[K - 1 - m, b_4]$$
$$x_2[m, b_8] = -s^*[K - 1 - m, b_3]$$
$$x_3[m, b_1] = s[m, b_3]$$
$$x_3[m, b_2] = -s[m, b_4]$$
$$x_3[m, b_3] = s[m, b_1]$$
$$x_3[m, b_4] = s[m, b_2]$$
$$x_3[m, b_5] = s^*[K - 1 - m, b_3]$$
$$x_3[m, b_6] = -s^*[K - 1 - m, b_4]$$
$$x_3[m, b_7] = s^*[K - 1 - m, b_1]$$
$$x_3[m, b_8] = s^*[K - 1 - m, b_2]$$

If there are four transmitters, then an encoding strategy for an embodiment of the present invention in a single carrier system having cyclic prefixes is given as follows:

$$x_1[m, b_1] = s[m, b_1] \quad (72)$$
$$x_1[m, b_2] = -s[m, b_2]$$
$$x_1[m, b_3] = -s[m, b_3]$$
$$x_1[m, b_4] = -s[m, b_4]$$
$$x_1[m, b_5] = s^*[K - 1 - m, b_1]$$
$$x_1[m, b_6] = -s^*[K - 1 - m, b_2]$$
$$x_1[m, b_7] = -s^*[K - 1 - m, b_3]$$
$$x_1[m, b_8] = -s^*[K - 1 - m, b_4]$$
$$x_2[m, b_1] = s[m, b_2]$$
$$x_2[m, b_2] = s[m, b_1]$$

-continued $$x_2[m, b_3] = s[m, b_4]$$
$$x_2[m, b_4] = -s[m, b_3]$$
$$x_2[m, b_5] = s^*[K - 1 - m, b_2]$$
$$x_2[m, b_6] = s^*[K - 1 - m, b_1]$$
$$x_2[m, b_7] = s^*[K - 1 - m, b_4]$$
$$x_2[m, b_8] = -s^*[K - 1 - m, b_3]$$
$$x_3[m, b_1] = s[m, b_3]$$
$$x_3[m, b_2] = -s[m, b_4]$$
$$x_3[m, b_3] = s[m, b_1]$$
$$x_3[m, b_4] = s[m, b_2]$$
$$x_3[m, b_5] = s^*[K - 1 - m, b_3]$$
$$x_3[m, b_6] = -s^*[K - 1 - m, b_4]$$
$$x_3[m, b_7] = s^*[K - 1 - m, b_1]$$
$$x_3[m, b_8] = s^*[K - 1 - m, b_2]$$
$$x_4[m, b_1] = s[m, b_4]$$
$$x_4[m, b_2] = s[m, b_3]$$
$$x_4[m, b_3] = -s[m, b_2]$$
$$x_4[m, b_4] = s[m, b_1]$$
$$x_4[m, b_5] = s^*[K - 1 - m, b_4]$$
$$x_4[m, b_6] = s^*[K - 1 - m, b_3]$$
$$x_4[m, b_7] = -s^*[K - 1 - m, b_2]$$
$$x_4[m, b_8] = s^*[K - 1 - m, b_1]$$

In these two equations, K is as was defined earlier, and $x_j[m,b]$ is the sequence to be transmitted out antenna j during the data portion of baud interval b, and s[m,b] is the $b^{th}$ sequence to be delivered to the receiver. These time-domain encoding strategies for three and four elements cause the frequency domain of the single carrier system to be encoded in a manner similar to the G3 and G4 codes described above. As a result, it is straightforward to extend the derivation of the Doppler-channel based receiver decoding strategies outlined above for the two transmit-element case to these two encoding strategies. Other encoding schemes are also in the spirit of this embodiment of the invention because to implement in the frequency domain a conjugation required by an encoding scheme, the time domain sequence to be transmitted is simply conjugated and time-reversed as can be seen by inspecting the both the code matrix G3 and G4 and equations (71) and (72). This time reversal and conjugation technique acts to conjugate the frequency domain symbol as is required by the encoding scheme.

The method and device of the present invention can be incorporated into a communications receiving device, base station, or subscriber unit as illustrated in FIG. 1. In the present invention, the term "device" can refer to any type of communications device such as a base station, subscriber unit, or other communications receiver or transmitter.

The present invention is implemented in a communication system where at least one desired transmitting device transmits information to a communication receiver having at least one antenna. In a preferred embodiment, pluralities of transmitting devices simultaneously transmit information to a communication receiver having a plurality of antennas. A transmitting device transmits its information in bursts that contain two components: a training interval and a data interval. The information transmitted in a training interval contains pilot symbol sequences of content and duration known by both the transmitting device and the communication receiver. The data interval contains data symbols that must be recovered at the receiving device. In the present invention, the term "burst" refers to any one of the following: a short or isolated transmission, a portion of a longer transmission, a portion of a continuous transmission, a portion of a semi-continuous transmission, a time-limited transmission, a bandwidth-limited transmission, or any combination thereof.

The method and device of the present invention provides for a means of weighting and summing the outputs of at least one receive antenna to simultaneously receive and recover the information transmitted simultaneously by at least one transmitting device. Also if more than one antenna is present at the communication receiver, then the method and device of the present invention can be used to enable an adaptive antenna to mitigate the effects of unwanted interference transmitted by other users of the occupied bandwidth, as well as motion induced interference, and intersymbol interference.

A preferred embodiment of the present invention described below typically operates in a time-varying delay-spread channel and operates under the assumption that the channel can change significantly over the occupied bandwidth and significantly in time. This requires a frequency-domain multi-user channel estimation technique for tracking the time and frequency variations of multiple transmitting antennas sharing the same time frequency channel.

FIG. 1, numeral 100, illustrates a wireless communication system in accordance with the preferred embodiment of the present invention. As shown in 100, a Base Station 110 provides communication service to a geographic region known as a cell 103. At least one User Devices 120 and 130 communicate with the Base Station 110. In some embodiments of the communication system of 100, at least zero External Interference Sources 140 share the same spectrum allocated to the base station 110 and subscriber devices 120 and 130. The External Interference Sources 140 represent an unwanted source of emissions that interferes with the communication process between the Base Station 110 and the User Devices 120 and 130. The exact nature and number of the External Interference Sources 140 will depend on the specific embodiment of the communication system of 100. In some cases, as is shown in 100, an External Interference Source will be another User Device 140 (similar in construction and purpose to User Device 120) that is communicating with another Base Station 112 in the same frequency spectrum allocated to Base Station 110 and User Devices 120 and 130. As shown in 100, User Devices 120 has a single antenna, while User Devices 130 have at least one antenna. The method and device of the present invention can be implemented as part of a Base Station 110 as well as part of a User Device 120 or 130.

Figure 2:
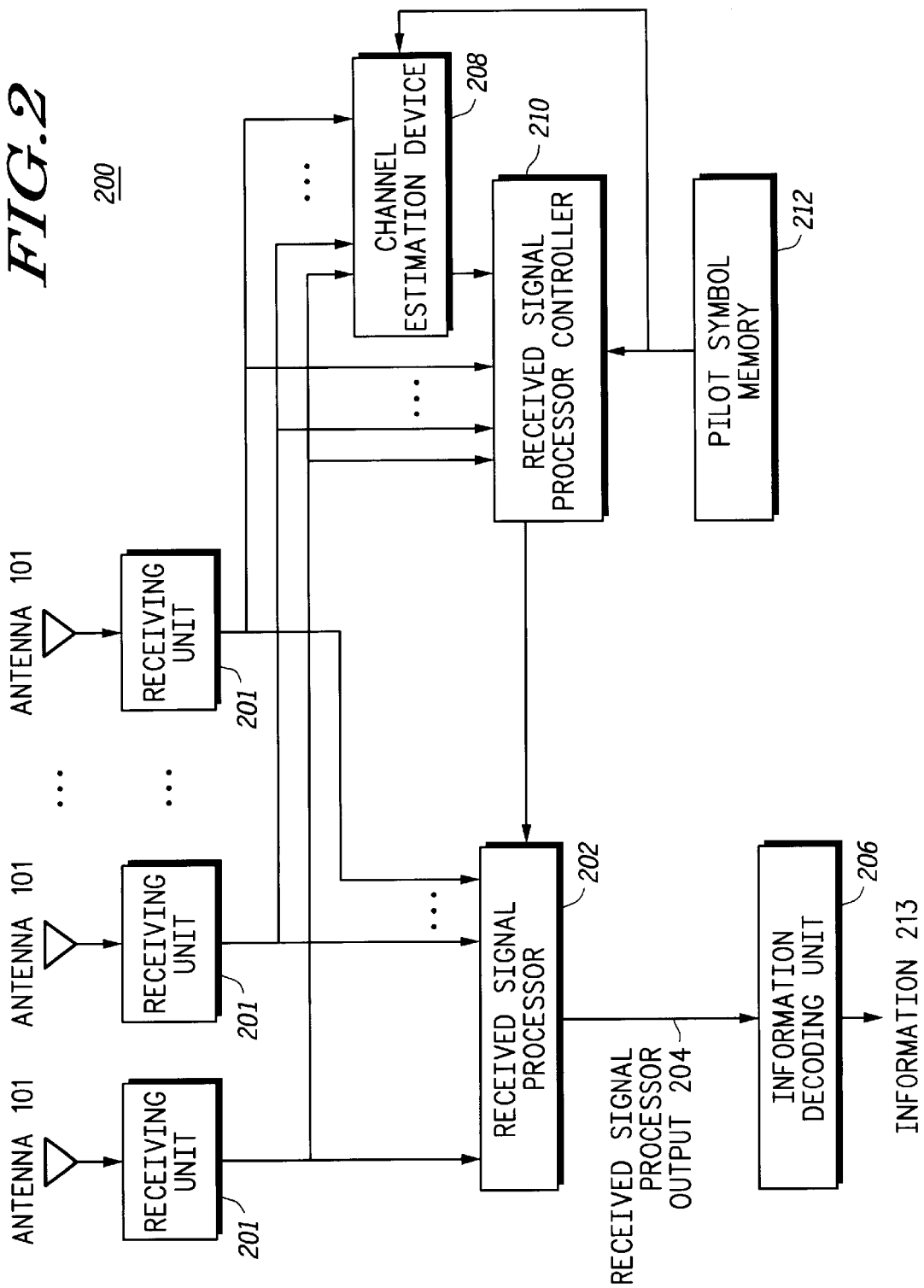
FIG. 2 is a block diagram illustrating a preferred embodiment of a receiver device in accordance with the present invention.

FIG. 2, numeral 200, is a block diagram illustrating a receiving device in accordance with the present invention. The communication receiver in accordance with the present invention includes at least one antenna (101) wherein the outputs of the antennas are each provided to a receiving unit (201). The outputs of the receiving units (201) are provided to at least one Received Signal Processor (202). The signals from the receiving units (201) are also fed into the Received Signal Processor Controller (210), which regulates the operation of the at least one Received Signal Processor (202). The signals from the receiving units (201) are also fed into the Channel Estimation Device (208). The Pilot Symbol Generator (212) generates pilot symbol information that is used by the Combiner Controller (210) to control the Received Signal Processor (202). The pilot symbol information generated by the Pilot Symbol Generator (212) is also used by the Channel Estimation Device (208) to estimate the time-varying frequency responses of the transmitting devices (110, 112, 120, 130, or 140, or any combination thereof). The output of a Received Signal Processor (202) is fed into an Information Decoding Unit (206), which decodes the Received Signal Processor Output (204) and generates data information (213) that was received by the Antennas (101).

Figure 3:
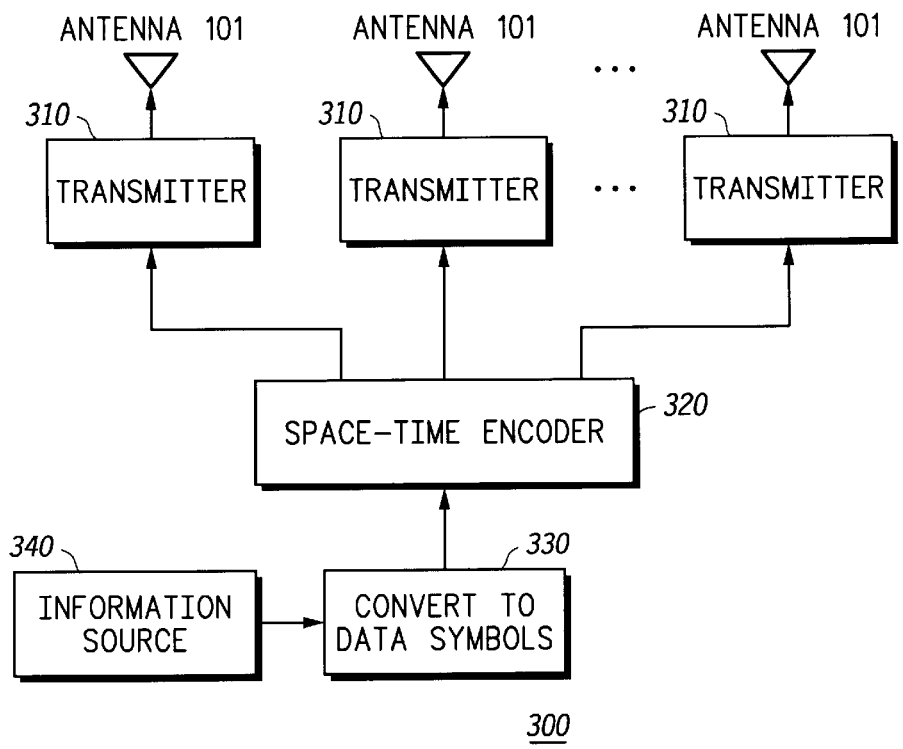
FIG. 3 is a block diagram illustrating a preferred embodiment of a transmitting device in accordance with the present invention.

FIG. 3, numeral 300 is a block diagram illustrating a transmitting device in accordance with the present invention. The transmitting device consists of at least two antennas 101 each driven by a transmitter unit 310. Information to be delivered from the transmitting device to a receiving device originates from an information source 340 and the information is then converted to complex data symbols in block 330. In one embodiment of the present invention, the complex data symbols computed in device 330 is mathematically denoted $s(k), s(k+1), \ldots, s(k+P)$, as is described earlier in this document. In another embodiment of the present invention, the complex data symbols computed in block 330 is mathematically denoted $s[m,b]$, as is described earlier in this document. The output of the device 330 is sent to a space-time encoder 320, which transforms the complex data symbols into signals that are to be fed to the transmitter units 310. In one embodiment of the present invention, the output of the space-time encoder is mathematically denoted $x_j(k), x_j(k+1), \ldots, x_j(k+P)$, where j denotes the associated transmitter unit 310, as is described earlier in this document. In another embodiment of the present invention, the output of the space-time encoder is mathematically denoted $x_j[m,b]$, as is described earlier in this document.

Figure 4:
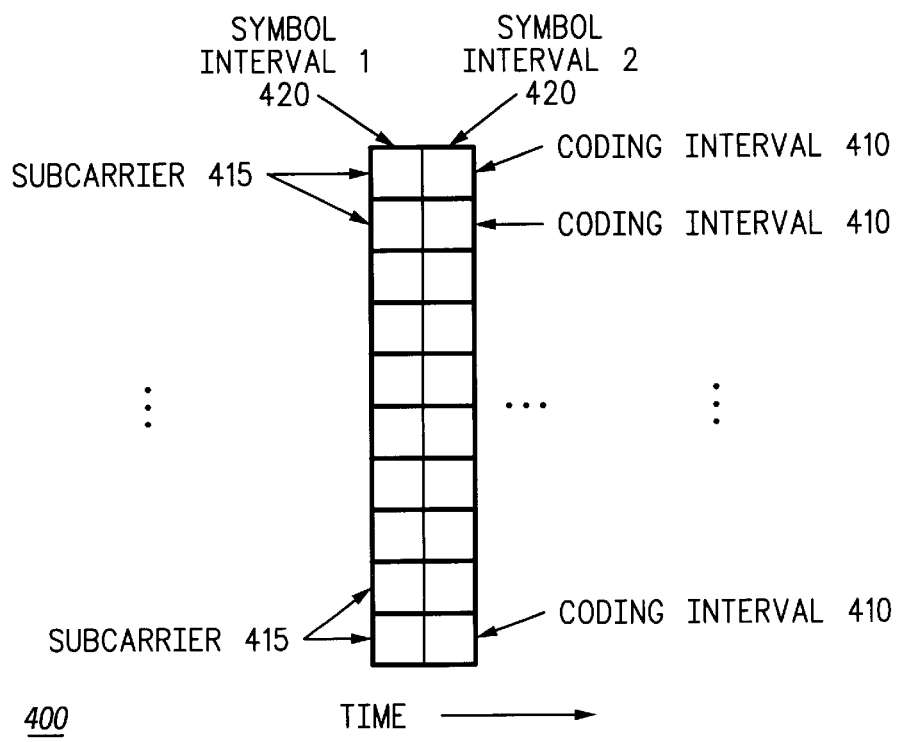
FIG. 4 is a representation of an information burst for an Orthogonal Frequency Division Multiplexing (OFDM) system being grouped into coding intervals, which can be used by the communication system in which the receiving device in FIG. 2 and the transmitting device in FIG. 3 operate.

FIG. 4, numeral 400, is a block diagram illustrating an information burst that is appropriate for the frequency domain of an OFDM or multicarrier system in the preferred embodiment of the present invention. In 400, the vertical axis represents the frequency dimension as measured in subcarriers 415, which are sometimes called frequency bins. The horizontal axis represents the time dimension as measured in Symbol Intervals 420. According to the method shown in 400, a particular Coding Interval 410 contains two data symbol intervals 420 that are on the same frequency subcarrier 415. This figure is appropriate for a space-time encoding strategy where the number of symbols P in the coding interval is two as was discussed above. Encoding strategies in other embodiments of the present invention have more than two symbol intervals 420 in the Coding interval 410.

Figure 5:
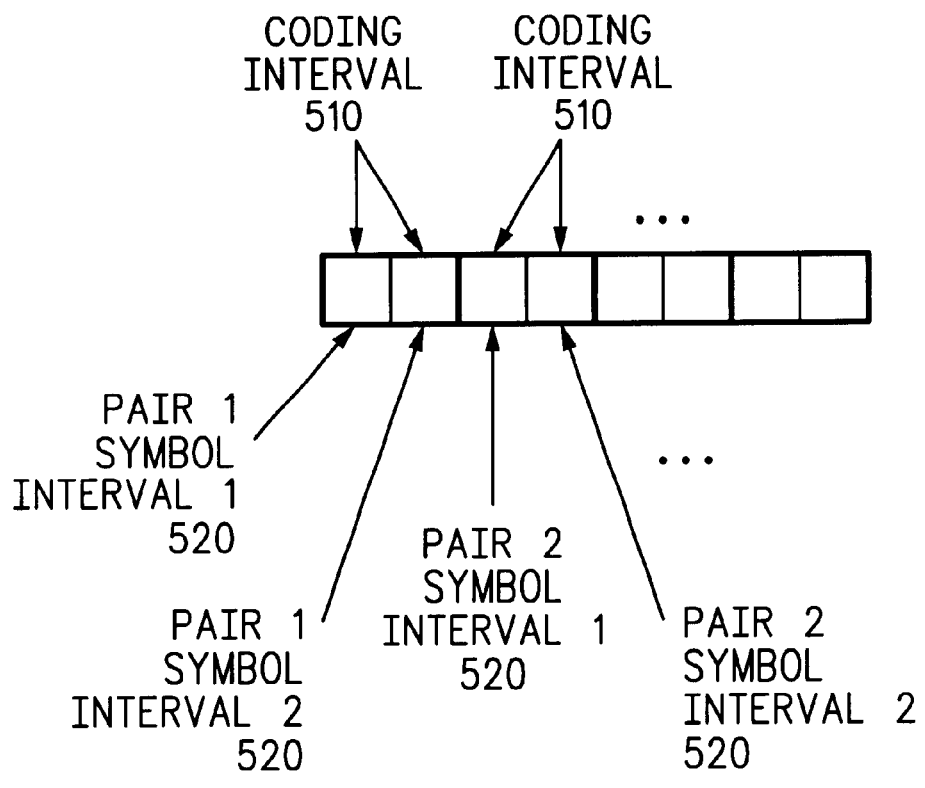
FIG. 5 is a representation of two adjacent information bursts being grouped into coding intervals, which can be used by the communication system in which the receiving device in FIG. 2 and the transmitting device in FIG. 3 operate.

FIG. 5, numeral 500, is a block diagram illustrating two adjacent information bursts that is appropriate for a single carrier system, or for one subcarrier, or frequency bin of a multicarrier system, or one time interval of a multicarrier system in the preferred embodiment of the present invention. In 500, the squares represent a symbol interval 520. If the system is a single carrier system or one subcarrier (frequency bin) of a multicarrier system, then the horizontal dimension of 500 represents successive symbol intervals 520 across the time dimension of the allocated time/frequency bandwidth of the system under consideration. If the system is a multicarrier system, then the horizontal dimension of 500 could represent successive symbols across the frequency dimension, all occupying the same time interval. In the encoding methodology shown in 500, two successive data symbol intervals 520 are combined to form a coding interval 510.

Figure 6:
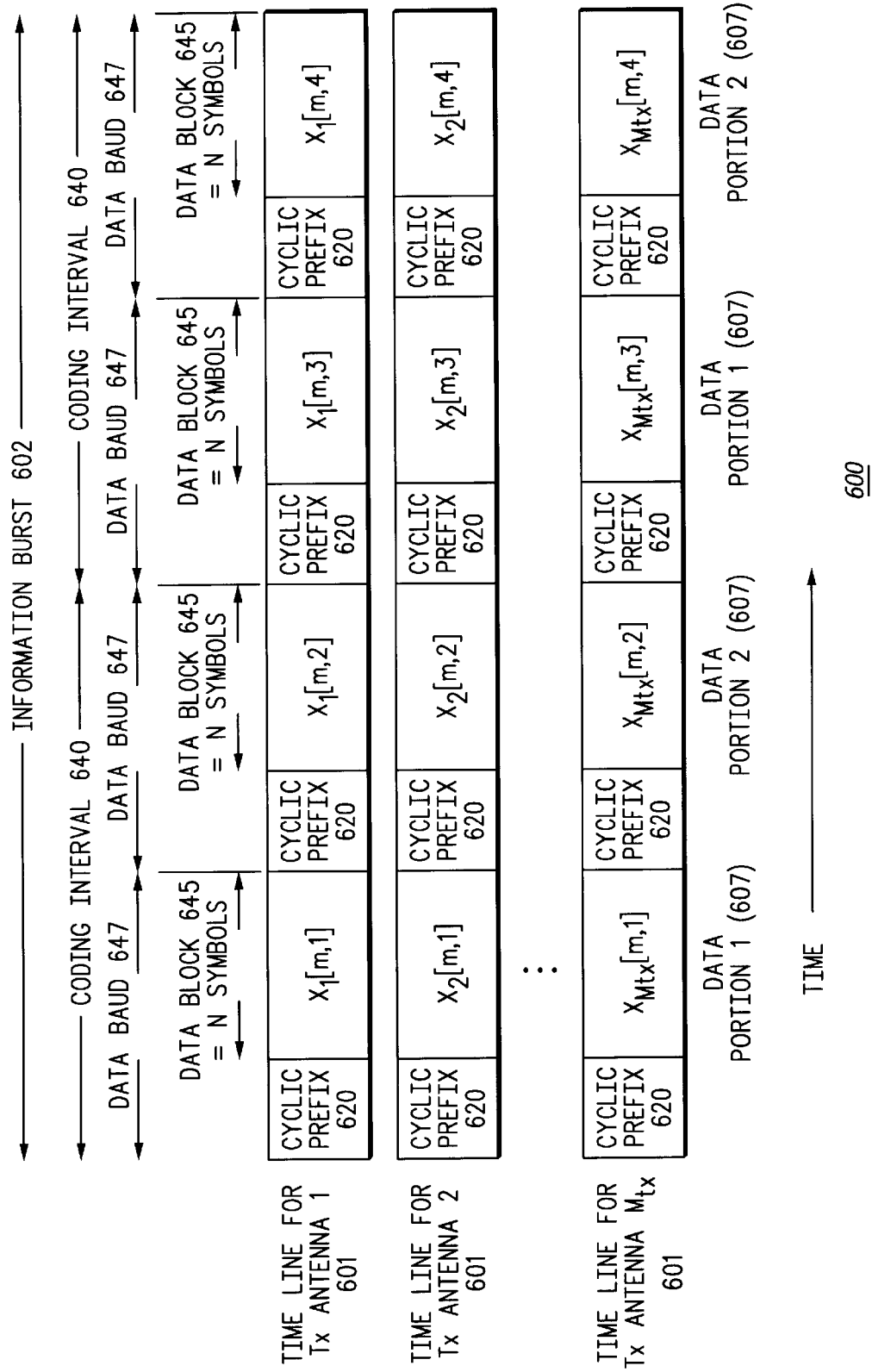
FIG. 6 is a representation of an information burst for a single carrier system employing cyclic prefixes, which can be used by the communication system in which the receiving device in FIG. 2 and the transmitting device in FIG. 3 operate.

FIG. 6, numeral 600, is a timing diagram composed of a series of time lines 601 showing how information is transmitted out of $M_{tx}$ transmit antennas in a cyclic prefix single carrier system. Each labeled block of N symbols 645 is FFT'd into the frequency domain. Information burst contains one or more coding interval 640, each containing two or more symbol blocks (also called "bauds") 647 consisting of an N symbol block 645 and a cyclic prefix 620. Each baud of N symbols 647 contains N data symbols and Lp cyclic prefix symbols. The Lp symbols comprising a cyclic prefix 620 are equal to the last Lp symbols in a data block 645. Each time line 601 shows the nature of the transmissions on each transmit antenna as a function of time in the cyclic prefix single carrier system. 600 shows the makeup of an information burst 602, which is comprised of one or more coding interval 640. For example, two coding intervals 640 are shown to belong to the information burst 602. Each coding interval 640 consists of two successive data bauds 647 that are of a duration equivalent to the time occupied by N+Lp successive data symbols. For example, the information burst 602 contains four data blocks 645. A data block 645 consists of a data portion 607 and a cyclic prefix 620. The N data symbols to be transmitted during the data portion 607 of a data block 645 are denoted $x_j[m,b]$, where j indicates the transmit antenna, m is a numeric identifier of the individual symbols within the symbol sequence ($0 \leq m \leq K-1$), and b is an integer identifying the data block in question. The purpose of the encoding strategy used by the present invention is to assign values to $x_j[m,b]$. The symbol sequence transmitted during a cyclic prefix 620 consists of a repetition of the last Lp symbols of the data portion 607. At the receiver, the N symbol-spaced samples received during a data block 645 are transformed into the frequency domain with an FFT or DFT or equivalent operation. Each data block 645 contains N+Lp symbols comprising N data symbols plus Lp cyclic prefix symbols in the cyclic prefix.

Figure 7:
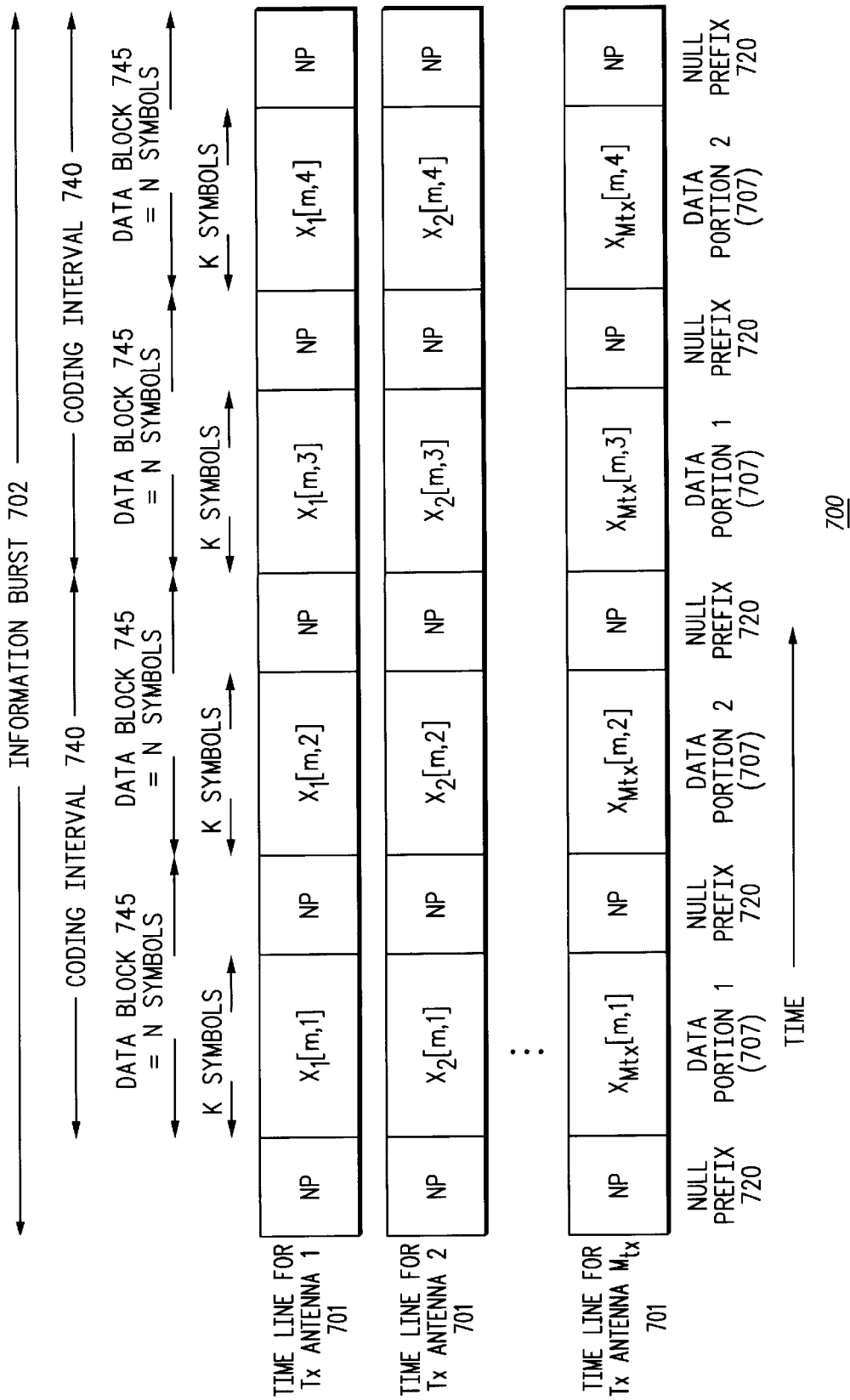
FIG. 7 is a representation of an information burst for a single-carrier system employing null prefixes, which can be used by the communication system in which the receiving device in FIG. 2 and the transmitting device in FIG. 3 operate.

FIG. 7, numeral 700, is a timing diagram composed of a series of time lines 701 showing how information is transmitted out of $M_{tx}$ transmit antennas in a Null Cyclic Prefix (NCP) single carrier system. 715 is a leading null cyclic prefix that is discarded at the receiver. Each labeled block of N symbols 745 is FFT'd into the frequency domain. Information burst contains one or more coding intervals 740, each containing two or more blocks of N symbols 745. Each block of N symbols 745 contains K data symbols and N−K null symbols. Each time line 701 shows the nature of the transmissions on each transmit antenna as a function of time in the null cyclic prefix single carrier system. 700 shows the makeup of an information burst 702, which is comprised of one or more coding intervals 740. For example, two coding intervals 740 are shown to belong to the information burst 702. Each coding interval 740 consists of two successive data blocks 745 that are of a duration equivalent to the time occupied by N successive data symbols. For example, the information burst 702 contains four data blocks 745. A data block 745 consists of a data portion 707 and a null cyclic prefix 720. The K data symbols to be transmitted during the data portion 707 of a data block 745 are denoted $x_j[m,b]$, where j indicates the transmit antenna, m is a numeric identifier of the individual symbols within the symbol sequence ($0 \leq m \leq K-1$), and b is an integer identifying the data block in question. The purpose of the encoding strategy used by the present invention is to assign values to $x_j[m,b]$. The symbol sequence transmitted during a null cyclic prefix 720 consists of zeros symbols that have a value of zero. At the receiver, the N symbol-spaced samples received during a data block 745 are transformed into the frequency domain with an FFT or DFT operation. Each data block 745 contains N symbols comprising K data symbols plus N–K zero symbols in a null cyclic prefix. Each data block is preceded by a null cyclic prefix. The first null cyclic prefix in the burst 715 is distinguished from the other null cyclic prefixes 720 in the burst because the symbols received during the first cyclic prefix of the burst are discarded at the receiver. The leading null cyclic prefix 715 is included to insure that every data portion of every data block is preceded and followed by a null cyclic prefix, therein insuring the appearance at the receiver of a circular channel.

Figure 8:
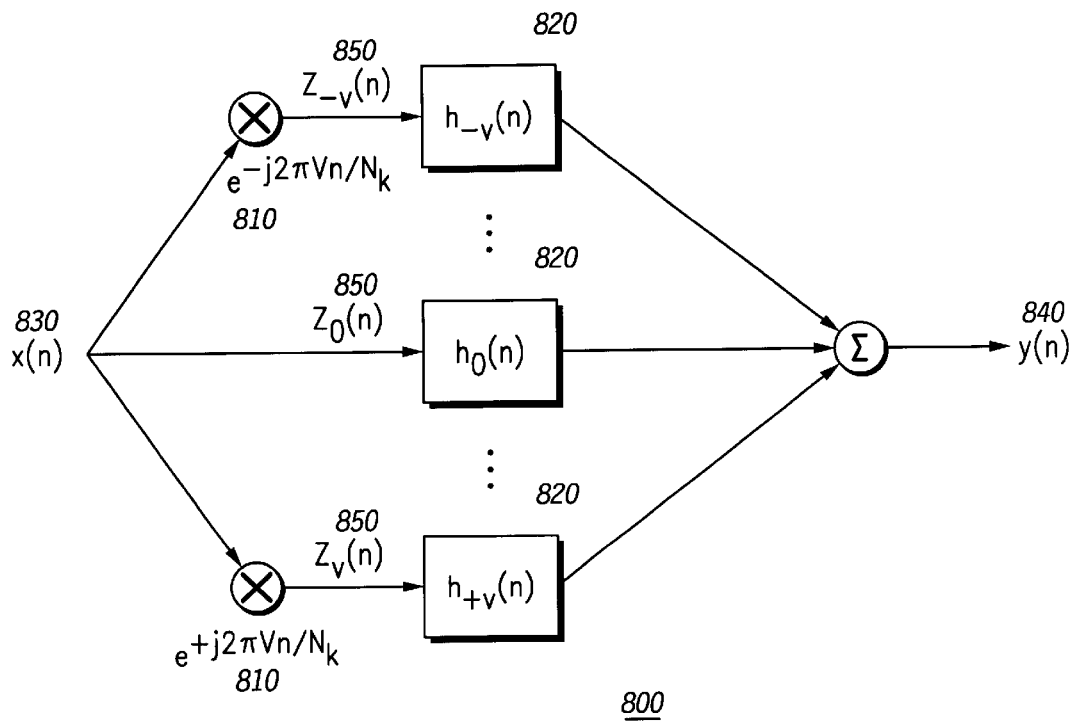
FIG. 8 is a representation of a time invariant channel model for a single-input single-output time varying channel.

FIG. 8, numeral 800, is a representation of the Time Invariant Channel Model for a single input single output time varying channel. 800 shows the structure of the model for the time-varying impulse response h(l,n), where l is the index of the differential delay of the impulse response, and n is the time sample number. The output from a single transmitter, x(n) (830) is sent through a time-varying channel with L taps and the received signal at a single receive antenna is y(n) (840). The output of the time-varying channel (840) can be adequately modeled as the sum of the convolution of $V_T=(2V+1)$ "Doppler channels" (820), $h_v(n)$ (v=–V, . . . +V) with x(n) (830) times the corresponding Doppler sinusoid $e^{-j2\pi vn/N_k}$ (810). In equation form, y(n) is:

$$y(n) = \sum_{v=-V}^{+V} h_v(n) * (x(n)e^{j2\pi vn/N_k}) + n(n) \qquad (73)$$

$$= \sum_{v=-V}^{V} h_v(n) * z_v(n) + n(n)$$

where the "Doppler signal", $z_v(n)$ (850), is $z_v(n)=x(n)e^{j2\pi vn/N_k}$ and * indicates linear convolution. The value of $N_k$ is arbitrary but the channel produced by this channel model will repeat over the data block unless $N_k$ is greater than the total length of the received data block that is processed. Thus in a preferred embodiment, $N_k$ is chosen to be twice the size of the data block.

It can be shown that the time-varying channel, h(l,n) (l=0 . . . L–1) at time any time n can be expressed as:

$$h(l,n) = \sum_{v=-V}^{+V} h_v(n) e^{-j2\pi vl/N_k} e^{j2\pi vn/N_k} \qquad (74)$$

Because $N_k \gg L$, $e^{-j2\pi vl/N_k}=1$, equation (74) becomes:

$$h(l,n) \approx \sum_{v=-V}^{+V} h_v(n) e^{j2\pi vn/N_k} \qquad (75)$$

It is clear from (73) and (75) that for communication systems with regular cyclic prefixes (e.g., OFDM), the time-varying channel destroys the cyclic prefix property. In other words, in time-varying channels the cyclic prefix portion of the data block is convolved with a different channel than the last portion of the data block. This causes Inter-Carrier Interference (ICI), which interferes with the proper demodulation of the received data. To avoid this problem, an embodiment of the present invention sends all zeros as both the cyclic prefix and postfix for all data blocks (this is referred to as null cyclic prefixes). This makes the Doppler signal, $z_v(n)$, in (73) have a cyclic prefix property because the Doppler sinusoid is multiplied by zeros before and after a block of data symbols. Thus, ICI is eliminated in equation (73) when the appropriate data block is DFT'd into the frequency-domain and when the true time-varying channel is adequately modeled with the elements of 800.

Figure 9:
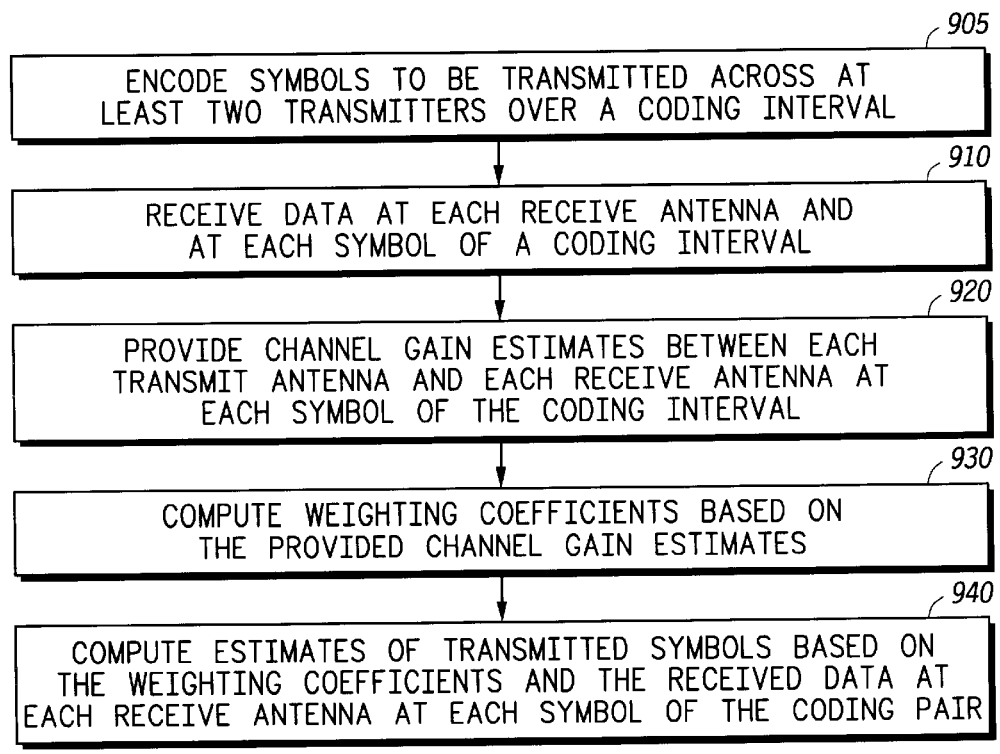
FIG. 9 is a flow chart representation of one embodiment of the method performed by the device of FIG. 2 for determining a symbol estimate for at least one transmitter in accordance with the present invention.

900 of FIG. 9 shows a flow chart that illustrates the steps performed by the Receiving Device 200 in accordance with part one of the present invention. The methodology employed by this invention is defined as follows: Data symbols to be transmitted are encoded 905 across at least two transmit antennas over the symbol intervals belonging to a coding interval 640. The coding interval 640 is comprised of at least two baud intervals 647. The data to be encoded can be encoded according to Equations (1) (28) for systems operating with flat faded symbol intervals, Equations (33), (49), and (50) for cyclic-prefix single carrier systems, and Equations (51), (71), (72) for null prefix single carrier systems. Data is received at each receive antenna and at each symbol of a coding interval 910. Channel gain estimates between each transmit antenna and each receive antenna at each symbol of the coding interval 920 are then provided. In the single carrier systems encoded according to (33), (49), and (50) or (51), (71), (72), the encoding intervals reside in the frequency domain, so the channel estimates provided in 920 are in the frequency domain. The weighting coefficients are computed based on the provided channel gain estimates 930. The process concludes by computing the estimates of transmitted symbols based on the weighting coefficients and the received data at each receive antenna at each symbol of the coding interval 940.

1000 of FIG. 10 shows a flow chart that illustrates the steps performed by part two of the present invention. The methodology employed by the second part is defined as follows: Two complex data symbol sequences $s[m,b_1]$ and $s[m,b_2]$ are provided to be transmitted over two baud intervals $b_1$ and $b_2$ 1010. The transmission is encoded across the transmit antenna and over the two baud intervals $b_1$ and $b_2$: $x_1[m,b_1]=1/\sqrt{2}s[m,b_1]$, $x_1[m,b_2]=-1/\sqrt{2}s^*[K-1-m,b_2]$, $x_2[m,b_1]=1/\sqrt{2}s[m,b_2]$, and $x_2[m,b_2]=1/\sqrt{2}s^*[K-1-m,b_1]$ 1020. With more than two transmit antennas other encoding schemes such as Equations (49), (50), (71), or (72) can be employed. The data is received at each receive antenna over the two baud intervals $b_1$ and $b_2$ and is converted to the received frequency domain symbols as equated by $$Y_i[k,b] = \sum_{m=0}^{N-1} y_i[m,b]e^{-j2\pi km/N},$$

$$Y_i(k) = \begin{bmatrix} Y_i[k,b_1] \\ Y_i^*[k,b_2] \end{bmatrix}, \text{ and}$$

$$Y(k) = \begin{bmatrix} Y_1(k) \\ Y_2(k) \\ \vdots \\ Y_{M_{RX}}(k) \end{bmatrix}$$

1030. The invention next provides estimates of the time-invariant Doppler channel gains between each transmit antenna and each receive antenna at each symbol of the coding interval 1040. If the Doppler Channel estimates are not in the Frequency domain 1050, they are converted as equated by $$H_{ijv}(k) = \sum_{l=0}^{L-1} h_{ijv}(l)e^{-j2\pi lk/N}$$

1060. Frequency-domain Channel Matrices are then assembled for each Doppler signal 850 and each Rx antenna 1070 as illustrated by the equations $$H_{iv}(k) =$$

$$\begin{bmatrix} H_{i1v}(k)e^{\frac{j2m\cdot n_{b1}}{N_k}} & H_{i2v}(k)e^{\frac{j2m\cdot n_{b1}}{N_k}} \\ H_{i2v}^*(k)e^{\frac{j2m\cdot (n_{b2}+K-1)}{N_k}} e^{\frac{j2\pi k(K-1)}{N}} & -H_{i1v}^*(k)e^{\frac{j2m\cdot (n_{b2}+K-1)}{N_k}} e^{\frac{j2\pi k(K-1)}{N}} \end{bmatrix}$$

and $$H_v(k) = \begin{bmatrix} H_{1v}(k) \\ H_{2v}(k) \\ \vdots \\ H_{M_{RX}v}(k) \end{bmatrix}.$$

The weighting coefficients can then be computed based on the provided channel gain estimates $w_1(k)=[R(k)+\sigma^2 I]^{-1}P_1(k)$ and $w_2(k)=[R(k)+\sigma^2 I]^{-1}P_2(k)$ where $$R(k) = \sum_{v=-V}^{+V} \sum_{w=-V}^{+V} H_v(k)H_w^H(k)\alpha(v-w) \text{ and}$$

$$\alpha(v) = e^{j2\pi(K-1)v/N_k} \frac{\sin[\pi vK/N_k]}{\sin[\pi v/N_k]} \text{ and}$$

$$P_1(k) = \sum_{v=-V}^{+V} H_v(k)\begin{bmatrix} \alpha(v) \\ 0 \end{bmatrix}$$

$$P_2(k) = \sum_{v=-V}^{+V} H_v(k)\begin{bmatrix} 0 \\ \alpha(v) \end{bmatrix}$$

1080. Frequency domain symbol-estimates based on the weighting coefficients and the received data at each receive antenna at the baud intervals $b_1$ and $b_2$ are then computed as $Z[k,b_1]=w_1^H(k)Y(k)$, $Z[k,b_2]=w_2^H(k)Y(k)$ 1090. If the system is an OFDM system or a similar system in which the transmitted information symbols reside in the frequency domain 1091, then the frequency domain symbol estimates are sent to a detection device 1092 to recover the transmitted information. If the system is a single carrier, TDMA, or CDMA system where the transmitted information symbols reside in the time domain 1091, the frequency domain symbols are converted to the time-domain 1093 before being sent to a detection device 1092.

The present invention may be embodied in other specific forms without departing from its spirit or essential characteristics. The described embodiments are to be considered in all respects only as illustrative and not restrictive.

We claim:

1. A method of operating a communication system including at least two transmitting antennas and at least one receive antenna comprising:
   encoding a plurality of symbols across the at least two transmitting antennas during a coding interval;
   receiving data at each receive antenna and at each symbol of the coding interval;
   providing a plurality of channel gain estimates between each transmit antenna and each receive antenna at each symbol of the coding interval; and
   determining an estimate of transmitted symbols based on the channel gain estimates and the received data at each receive antenna at each symbol of the coding interval, wherein the step of determining comprise the steps of
   computing a set of weighting coefficients based on the provided channel gain estimates; and
   computing an estimate of transmitted symbols based on the set of weighting coefficients and the received data at each receive antenna at each symbol of the coding interval.

2. The method of claim 1 wherein an information decoding unit is provided the estimates of the transmitted symbols to achieve spatial diversity in a communication link while mitigating channel variations.

3. The method of claim 1 wherein time variations in the channel response are accounted for in the step of providing the channel gain estimates.

4. A method of operating a communication system including at least one transmitter and a transmission over at least two transmitting antennas, and at least one receive antenna comprising:
   providing at least two data symbol sequences to be transmitted over at least one coding interval;
   encoding across the transmitting antennas and during the at least one coding interval;
   receiving data at each receive antenna during the at least one coding interval;
   converting the received data to a frequency-domain;
   providing Doppler channel estimates of a time-invariant Doppler channel gain between each transmitting antenna and each receive antenna;
   computing a frequency-domain channel matrix for each received Doppler signal and receive antenna;
   computing a weighting coefficient based on the provided Doppler channel estimates and the frequency-domain channel matrix; and
   computing a plurality of symbol estimates based on the weighting coefficients and the received data at each receive antenna during the coding interval.

5. The method of claim 4 wherein the symbol estimates are provided to an information decoding unit to achieve spatial diversity in a communication link while mitigating channel variations.

6. The method of claim 4 wherein time domain Doppler channel estimates are converted to frequency-domain Doppler channel estimates.

7. The method of claim 4 wherein the transmitted symbol sequences are recovered using the symbol estimates.

8. A receiver for a wireless communication system comprising:
   means for encoding a plurality of symbols across the at least two transmitters during a coding interval;
   means for receiving data at each receive antenna and at each symbol of the coding interval;
   means for providing a plurality of channel gain estimates between each transmit antenna and each receive antenna at each symbol of the coding interval; and
   means for determining an estimate of transmitted symbols based on the channel gain estimates and the received data at each receive antenna at each symbol of the coding interval, wherein the means for determining comprises:
   means for computing a set of weighting coefficients based on the provided channel gain estimates; and
   means for computing an estimate of transmitted symbols based on the set of weighting coefficients and the received data at each receive antenna at each symbol of the coding interval.

9. A receiver for a wireless communication system comprising:
- means for providing at least two data symbol sequences to be transmitted over at least one coding interval;
- means for encoding across at least two transmitting antennas and during the at least one coding interval;
- means for receiving data at least one receive antenna during the at least one coding interval;
- means for converting the received data to a frequency-domain;
- means for providing Doppler channel estimates of a time-invariant Doppler channel gain between each transmitting antenna and each receive antenna;
- means for computing a frequency-domain channel matrix for each received Doppler signal and receive antenna;
- means for computing a weighting coefficient based on the provided Doppler channel estimates and the frequency-domain channel matrix; and
- means for computing a plurality of symbol estimates based on the weighting coefficients and the received data at each receive antenna during the coding interval.

10. A computer readable medium storing a computer program comprising:
- computer readable code for providing at least two data symbol sequences to be transmitted during at least one coding interval;
- computer readable code for encoding across at least two transmitting antennas and during the at least one coding interval;
- computer readable code for receiving data at at least one receive antenna during the at least one coding interval;
- computer readable code for converting the received data to a frequency-domain;
- computer readable code for providing Doppler channel estimates of a time-invariant Doppler channel gain between each transmit antenna and each receive antenna at each symbol of the coding interval;
- computer readable code for computing a frequency-domain channel matrix for each received Doppler signal and receive antenna;
- computer readable code for computing a weighting coefficient based on the provided Doppler channel estimates and the frequency-domain channel matrix; and
- computer readable code for computing a plurality of symbol estimates based on the weighting coefficients and the received data at each receive antenna during the coding interval.

11. In a communication system having a transmitter transmitting with at least two antennas, a method for transmitting on one of the antennas, the method comprising the steps of:
- receiving data blocks containing data;
- reversing the order of the data blocks to produce reversed order data blocks;
- conjugating data within one of the reverse-ordered data blocks to produce conjugated data within a reverse-ordered data block;
- time reversing the conjugated data within the reverse-ordered data block to produce time-reversed, conjugated data within the reverse ordered data block; and
- transmitting the time-reversed, conjugated data within the reverse ordered data block.

12. In a communication system having a transmitter transmitting with at least two antennas, an apparatus comprising:
- means for receiving data blocks containing data;
- means for reversing the order of the data blocks to produce reversed order data blocks;
- means for conjugating data within one of the reverse-ordered data blocks to produce conjugated data within a reverse-ordered data block;
- means for time reversing the conjugated data within the reverse-ordered data block to produce time-reversed, conjugated data within the reverse ordered data block; and
- means for transmitting the time-reversed, conjugated data within the reverse ordered data block.

* * * * *